US011749282B1

(12) United States Patent
Mandal et al.

(10) Patent No.: US 11,749,282 B1
(45) Date of Patent: Sep. 5, 2023

(54) GOAL-ORIENTED DIALOG SYSTEM

(71) Applicant: Amazon Technologies, Inc., Seattle, WA (US)

(72) Inventors: Arindam Mandal, Redwood City, CA (US); Devesh Mohan Pandey, Redwood City, CA (US); Kjel Larsen, Seattle, WA (US); Prakash Krishnan, Santa Clara, CA (US); Raefer Christopher Gabriel, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 368 days.

(21) Appl. No.: 16/866,903

(22) Filed: May 5, 2020

(51) Int. Cl.
*G10L 15/26* (2006.01)
*G10L 15/08* (2006.01)

(52) U.S. Cl.
CPC ............. *G10L 15/26* (2013.01); *G10L 15/08* (2013.01)

(58) Field of Classification Search
None
See application file for complete search history.

(56) References Cited

U.S. PATENT DOCUMENTS

| | | | |
|---|---|---|---|
| 6,757,362 B1* | 6/2004 | Cooper | H04M 3/527 |
| | | | 379/88.16 |
| 10,600,406 B1* | 3/2020 | Shapiro | G10L 15/22 |
| 11,076,039 B2* | 7/2021 | Weinstein | H04L 51/18 |
| 11,106,979 B2* | 8/2021 | Ramanath | G06F 16/248 |
| 11,264,132 B2* | 3/2022 | Matsui | A61B 5/02 |
| 11,409,913 B2* | 8/2022 | Kawakami | H04W 12/37 |
| 11,455,987 B1* | 9/2022 | Dabas | G06F 3/167 |
| 2004/0229598 A1* | 11/2004 | Tajima | G06Q 20/1235 |
| | | | 455/414.1 |
| 2005/0033582 A1* | 2/2005 | Gadd | G10L 15/26 |
| | | | 704/E15.04 |
| 2014/0278413 A1* | 9/2014 | Pitschel | G10L 15/22 |
| | | | 704/243 |
| 2019/0188013 A1* | 6/2019 | Krishna | G06Q 10/10 |
| 2020/0301657 A1* | 9/2020 | Edmonds | G10L 15/22 |
| 2020/0342032 A1* | 10/2020 | Subramaniam | G10L 15/063 |
| 2020/0395018 A1* | 12/2020 | Burakov | G10L 15/26 |
| 2021/0034694 A1* | 2/2021 | Peter | G06F 16/972 |
| 2021/0103831 A1* | 4/2021 | Chu | G06N 20/00 |
| 2021/0406099 A1* | 12/2021 | Feuz | H04L 51/224 |

* cited by examiner

*Primary Examiner* — Neeraj Sharma
(74) *Attorney, Agent, or Firm* — PIERCE ATWOOD LLP

(57) ABSTRACT

A dialog system receives a user request corresponding to a dialog with a user. The dialog system processes the user request to determine multiple service providers capable of responding to the user request. The dialog system selects one service provider based on a request-to-handle score, and selects another service provider based on a satisfaction rating. The dialog system updates the dialog state based on further input provided by the user to determine an output responsive to the user request.

20 Claims, 10 Drawing Sheets

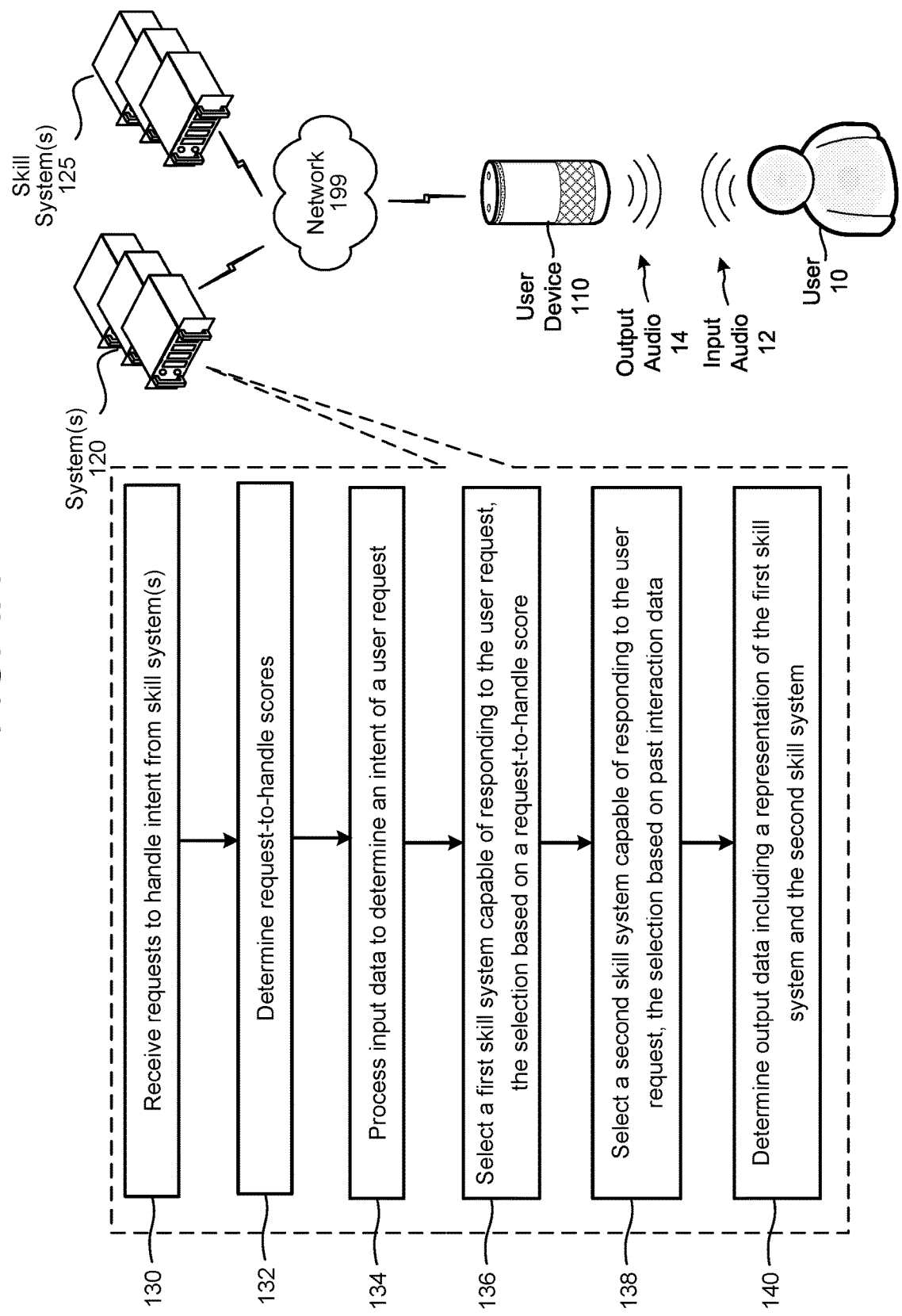

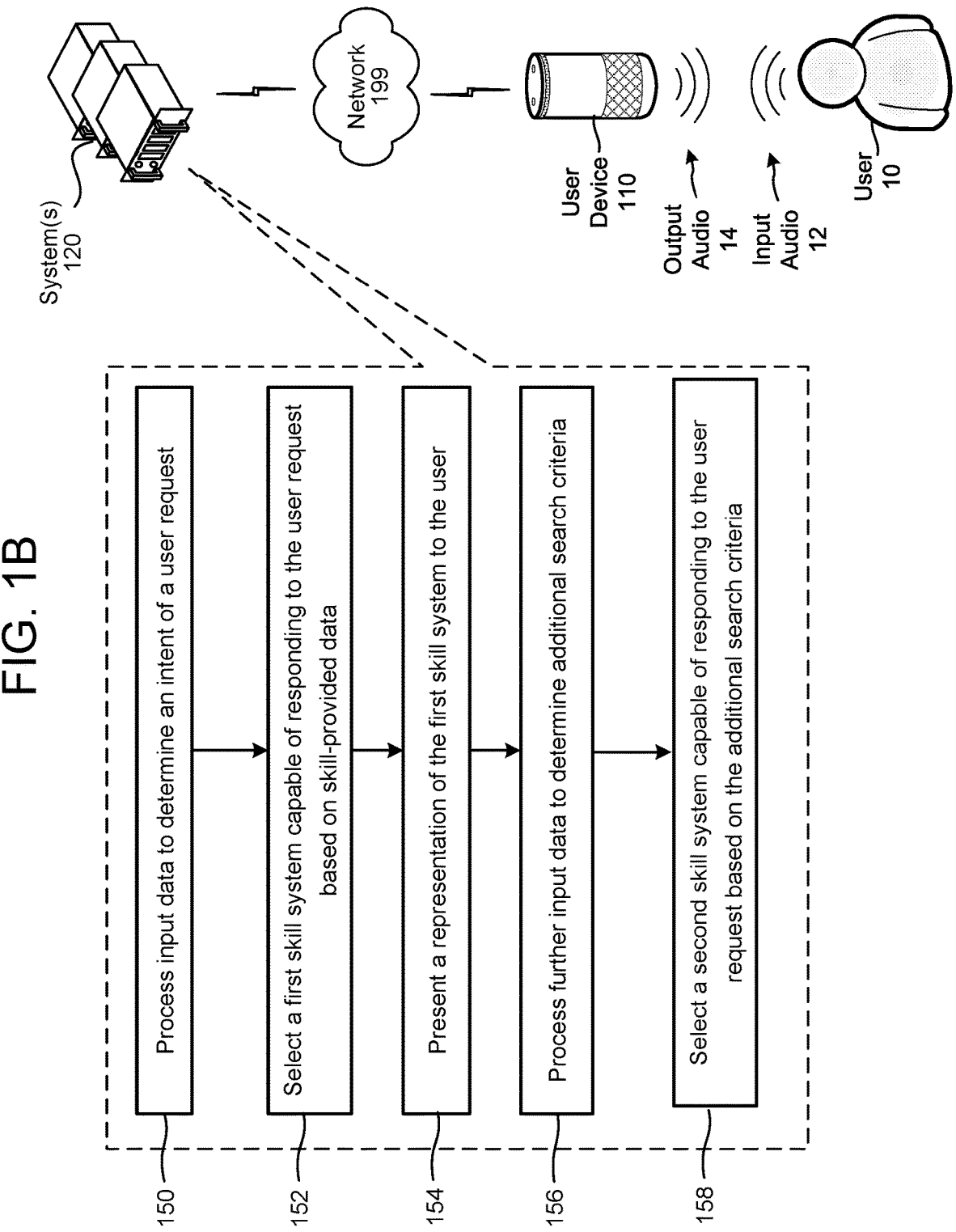

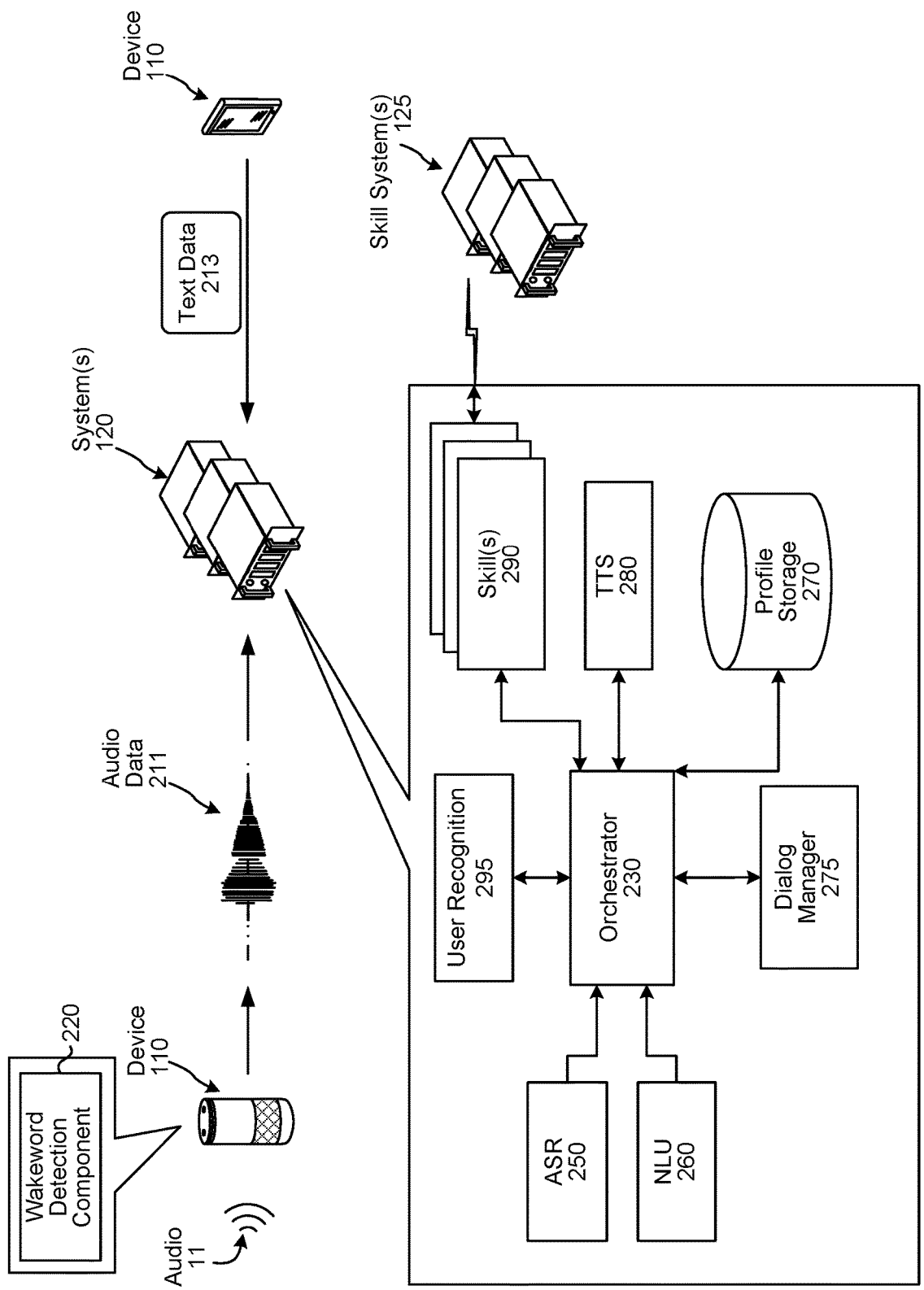

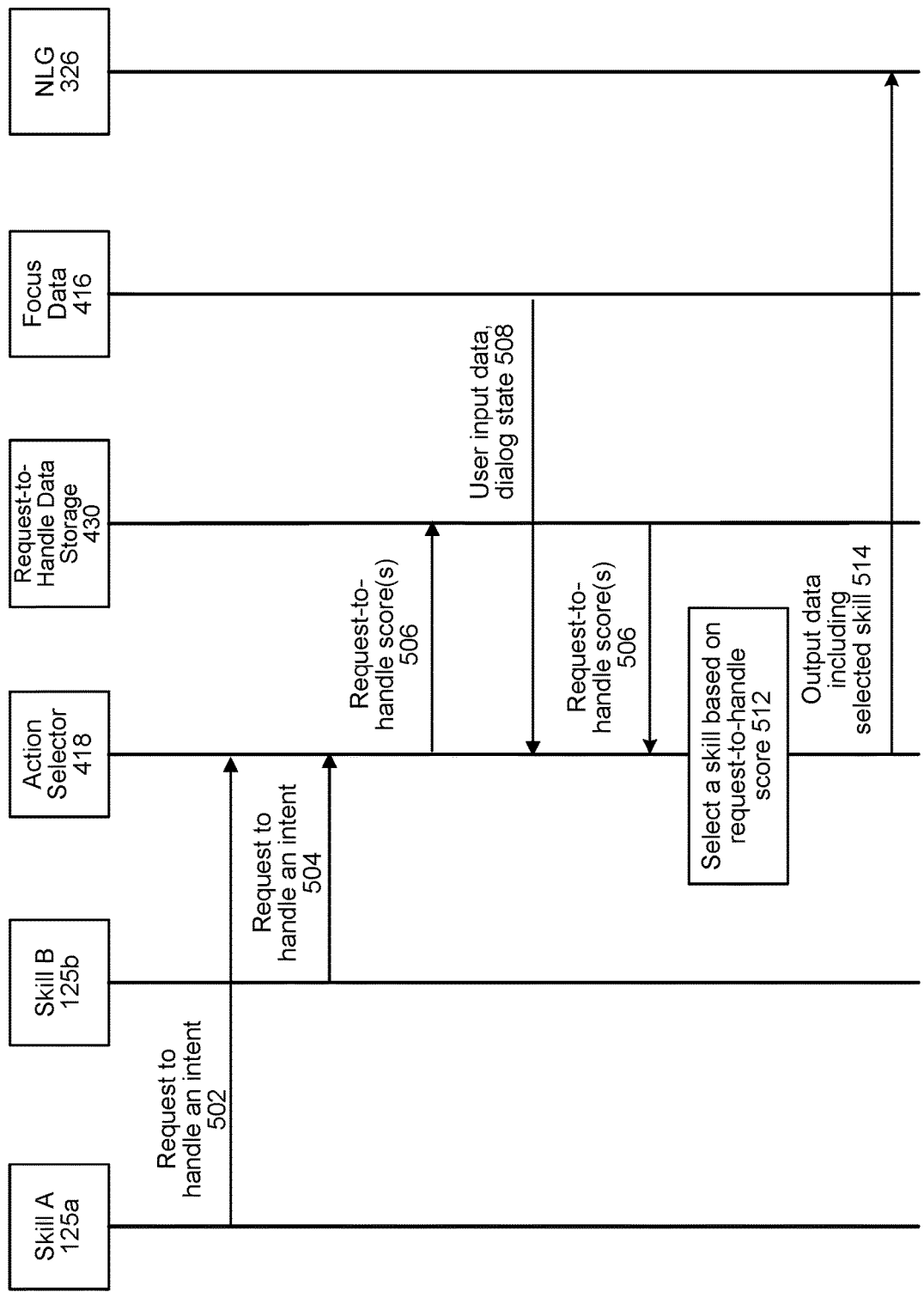

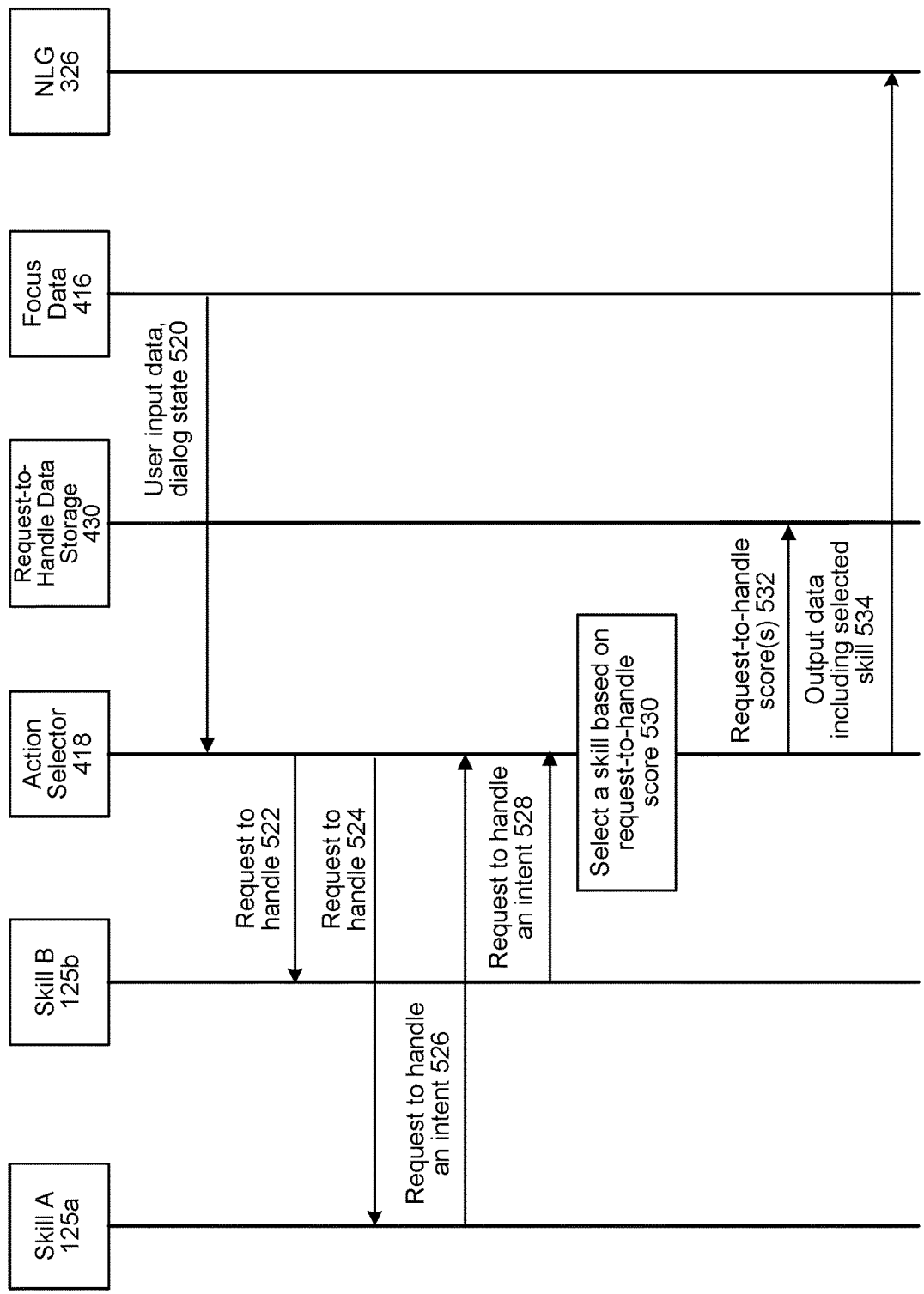

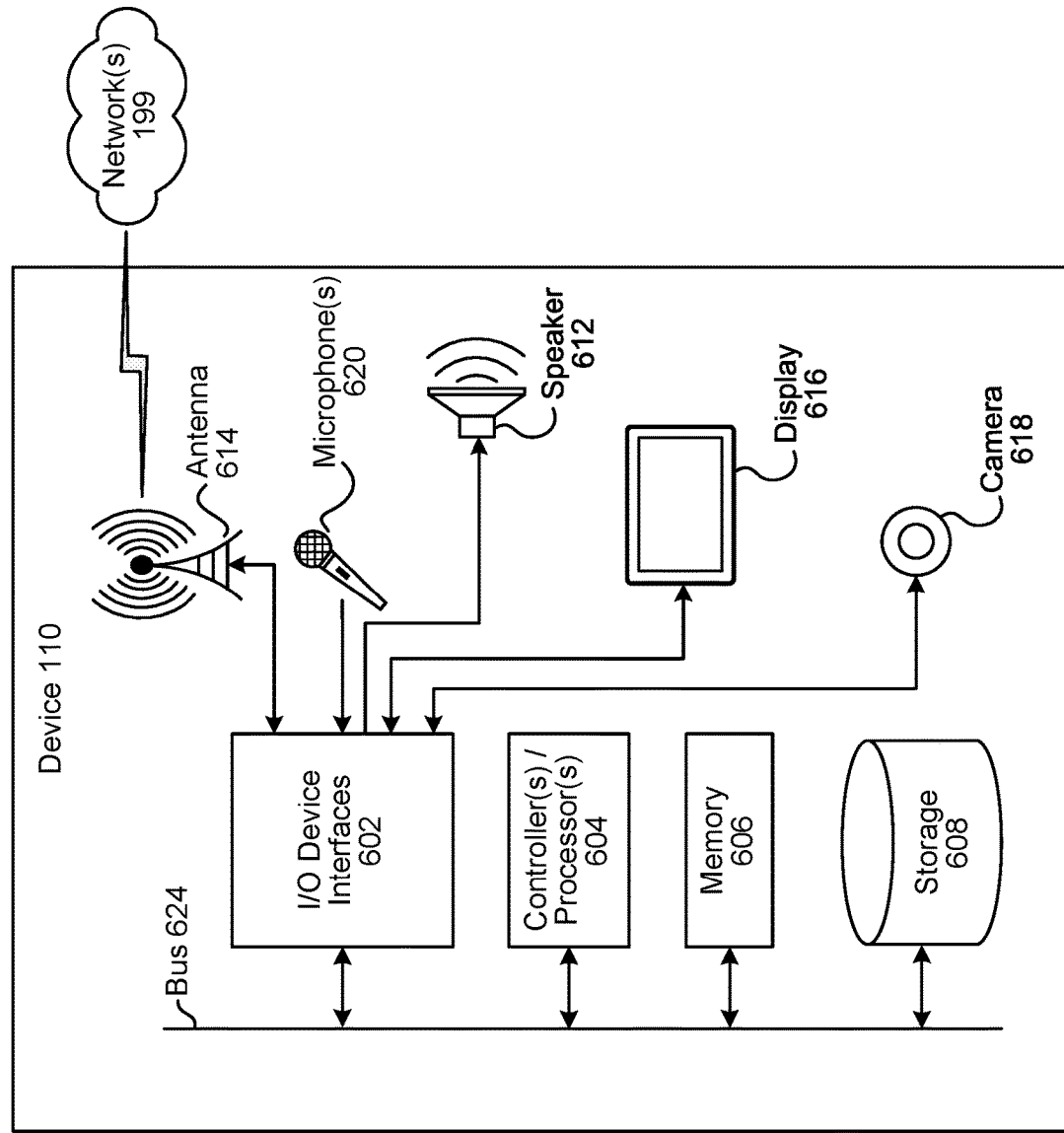

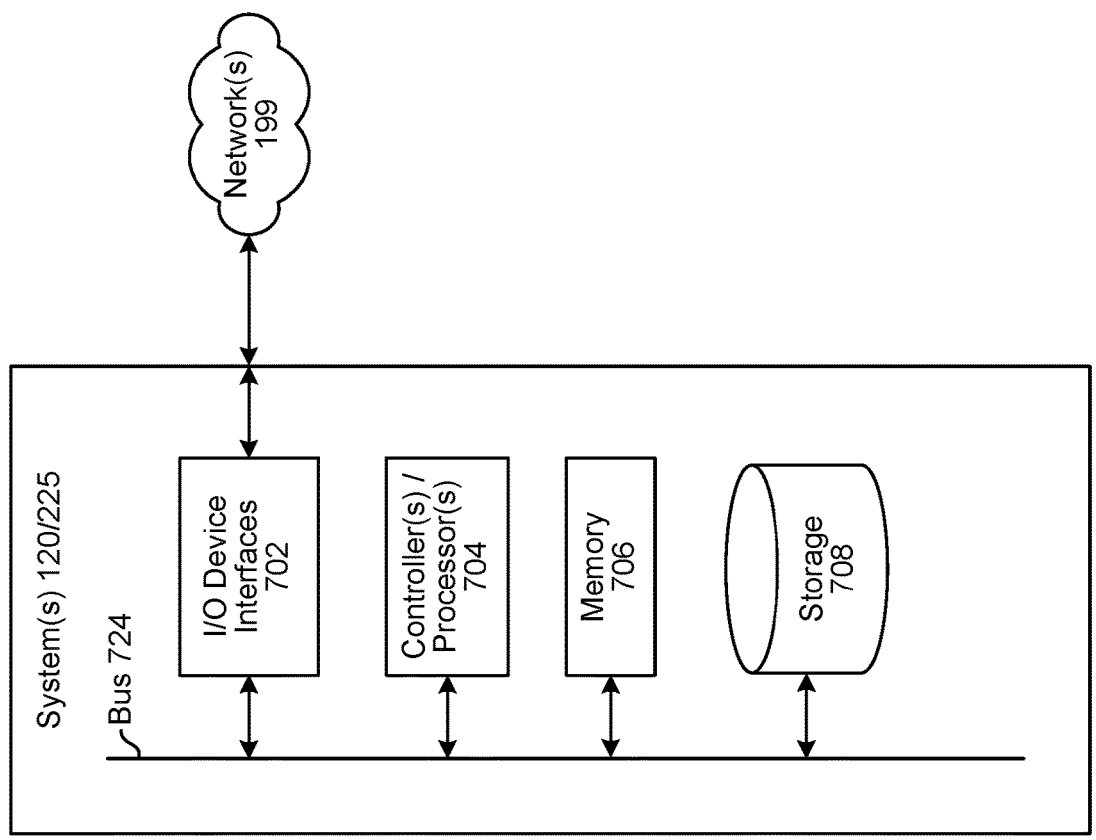

GOAL-ORIENTED DIALOG SYSTEM

BACKGROUND

Speech-recognition systems have progressed to a point at which human users are able to control computing devices using their voices. These systems employ techniques to identify words spoken by the user based on the various qualities of a received audio input. Speech-recognition processing combined with natural-language understanding processing enables voice-based control of a computing device to perform tasks based on the user's spoken commands. The combination of speech-recognition processing and natural-language understanding processing is referred to herein as speech processing. Speech processing may also involve converting a user's speech into text data, which may then be provided to other applications. Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A and 1B illustrate a system for responding to a user request according to embodiments of the present disclosure.

FIG. 2 is a conceptual diagram of components of a system according to embodiments of the present disclosure.

FIGS. 5A and 5B illustrate process flow diagrams for managing goal-oriented dialog using multiple dialog models according to embodiments of the present disclosure.

FIG. 6 is a block diagram conceptually illustrating example components of a device according to embodiments of the present disclosure.

FIG. 7 is a block diagram conceptually illustrating example components of a system according to embodiments of the present disclosure.

DETAILED DESCRIPTION

Figure 3:
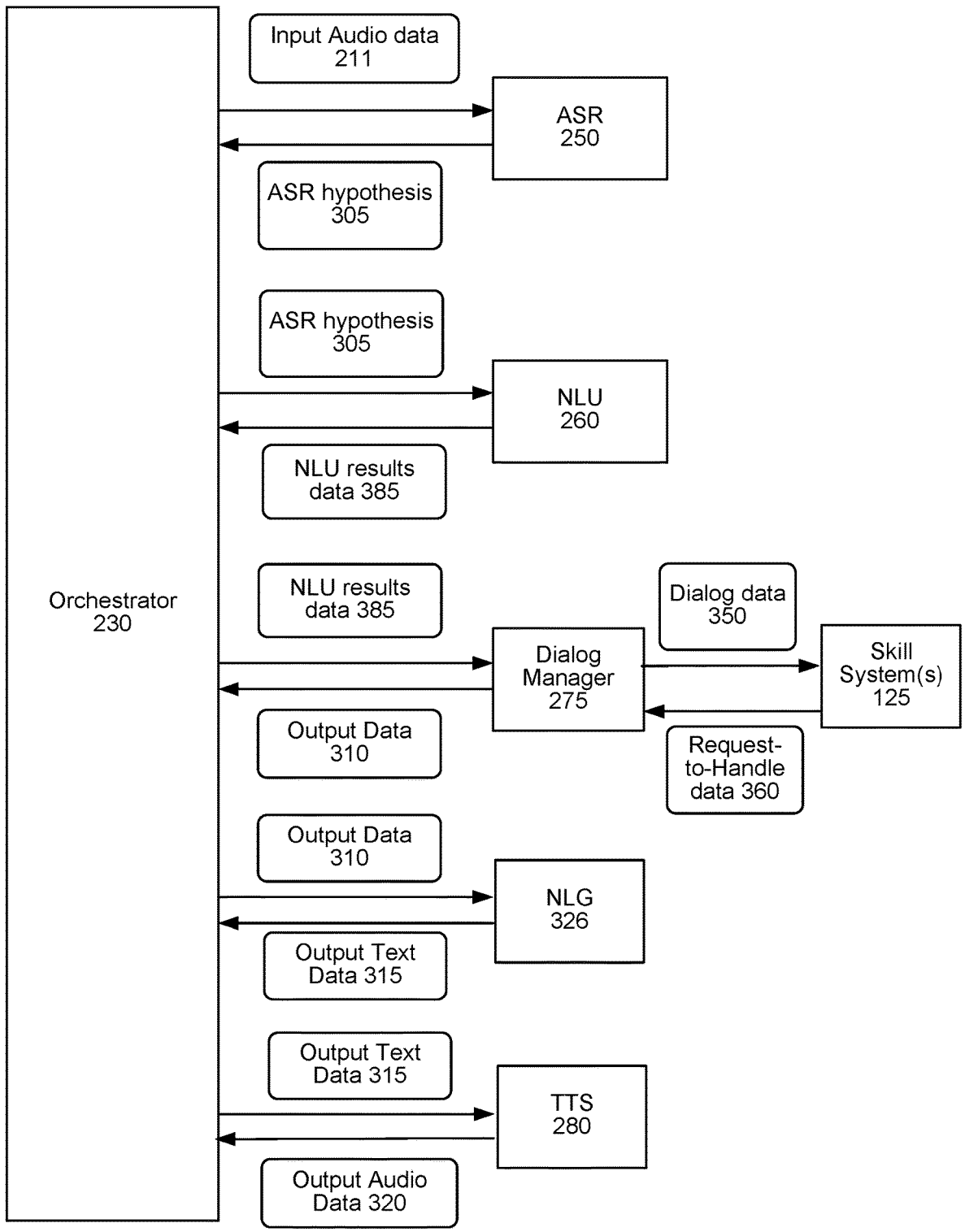
FIG. 3 is a conceptual diagram illustrating how a user request may be processed at runtime using skill systems, according to embodiments of the present disclosure.

Dialog processing, as used herein, is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems (also referred to as chatbots) often need to recognize, store, and use information received from more than one input during a back-and-forth or "multi-turn" interaction with the user. In some goal-oriented dialog sessions, the system may continue asking the user for inputs to determine search criteria to offer/recommend an appropriate service provider or otherwise provide the appropriate information.

Described herein is a system and method for providing a user with various results to a user request in a turn-by-turn dialog setting. The user inputs may be provided as voice inputs, text inputs, or in other input forms. The system output may be provided as synthesized speech, displayed text, or in other output forms. After understanding the request, the system can determine multiple service providers that can fulfill the user request. The system may select one or two of the service providers to present to the user. In some cases, the user may provide feedback or further information regarding the user request, which the system may use to determine another service provider. An example dialog is illustrated in Table 1.

TABLE 1

Sample Dialog

| Turn Number | User Input | System Output |
|---|---|---|
| 1 | "Hi." | "Hello, what can I help you with today?" |
| 2 | "I am hungry." | [API:food] "How about Mexican food?" |
| 3 | "No, I had tacos yesterday." | [API:food, filter:NOT Mexican] "How about Italian then?" |
| 4 | "Yes that sounds good." | [API:food, filter:Italian] "Italian restaurant ABC has a 5 star rating. Would you like to hear the menu?" |
| 5 | "OK." | |

In some embodiments, service providers, such as app developers, restaurants, department stores, car ride/taxi services, etc. can bid or otherwise send request-to-handle data to provide certain responses by submitting a request to respond, and the system may choose a service provider to fulfill a user request based on information included in the request to respond by the service provider. The service provider may send the request-to-handle data via a skill system (e.g., 125). For example, a taxi service provider may use its corresponding taxi skill to submit a request to respond including information that specifies a performance goal to respond to 10,000 user requests relating to booking a taxi/car ride in the Boston area within 48 hours. The request to respond may also include incentive information that the service provider may offer to the system for facilitating the service provider achieving its performance goal. If a user does not specify a service provider when requesting a car ride, the system may select the taxi skill to respond to the user request to enable the taxi skill to fulfill its performance goal. In some embodiments, the system may not select the taxi skill, and may select another service provider based on data corresponding to the other service provider's ability to respond to the user request and/or based on data corresponding to the user/user request.

Service providers may use different skill systems to provide the request-to-handle data to the system. For example, an ABC restaurant (service provider) may submit the request-to-handle data via a restaurant reservation skill and/or a food delivery skill. Based on a user request relating to an intent to make a restaurant reservation, the system may present the restaurant reservation skill to the user and in particular may recommend the ABC restaurant. Based on a user request relating to an intent to order food delivery, the system may present the food delivery skill to the user and in particular may recommend the ABC restaurant. Skill systems (e.g., 125) can also submit request-to-handle data to the system. For example, a hotel booking skill may submit request-to-handle user requests relating to booking a hotel, and the system may recommend the hotel booking skill to the user.

The system may determine which service providers/skills to present to the user based on the request to respond submitted by the service provider and/or a past interaction data. Referring to the sample dialog of Table 1, a Mexican restaurant may have submitted a request to respond to cause the system to present the Mexican restaurant as the service provider for 10,000 user requests. Because of the data provided by the service provider (e.g., request to respond), the system may present Mexican food as the first option to the user request. When the user responds 'no', the system may update the search criteria to not include Mexican restaurant, and may determine to present an Italian restaurant based on past interaction data corresponding to the restaurant (e.g., user preference for the Italian restaurant). Thus, the system may select a skill based on skill-provided data that corresponds to the skill responding to future user inputs, and may be unrelated to past user interactions or past interaction data. In some cases, the skill-provided data (e.g., incentive value) may be based on past user interaction data.

The request to respond and the user satisfaction rating can relate to a specific service/task the service provider is capable of performing. For example, the travel booking skill may have a particular performance goal, incentive information or user satisfaction rating associated with hotel bookings, and may have another performance goal, incentive information or user satisfaction rating associated with flight bookings.

In some embodiments, if the user specifies the skill in the request, the system may recommend another skill based on the skill-provided data, past interaction data, better price (or other aspects) offering, etc. For example, the user may request the system to book a car ride using the first taxi skill, but the system may determine that a second taxi skill has a better time to destination and/or a better price for the ride. In this case, the system may offer the second skill to the user by responding "<name of second taxi skill> has a better price right now for that trip. Would you like to use that instead of <name of first taxi skill>?"

FIGS. 1A and 1B illustrate a system for responding to a user request according to embodiments of the present disclosure. Referring to FIGS. 1A and 1B, a user 10 utters speech that is represented by input audio 12. A user device 110 receives the input audio 12 and transduces it (using, e.g., a microphone) into corresponding audio data. As explained in further detail below, the user device 110 may perform additional speech processing and/or may send the audio data to a system(s) 120 for additional speech processing via a network 199. Regardless of whether it is performed by the user device 110 and/or the system(s) 120, an ASR component may process the audio data to determine corresponding text data, and an NLU component may process the text data to determine NLU data such as a domain, intent, slot value, and/or entity associated with the text data. A skill system(s) 125 may be in communication with the system(s) 120 via the network 199.

Referring to FIG. 1A, the system(s) 120 receives (130) requests to handle an intent from the skill system(s) 125. A service provider associated with the skill system(s) 125 may send the system(s) 120 a request to handle an intent (e.g., a bid to respond to particular user requests). As used herein, a request to handle an intent may be a request sent by a service provider via the skill system 125 to inform the system(s) 120 that the service provider would like to have an opportunity to respond to user requests corresponding to the particular intent. In some cases, the request to handle an intent may indicate the service provider's desire to have the first opportunity to respond to the user request over other service providers capable of handling the intent.

The request to handle an intent may specify the intent, for example, book a car ride, restaurant reservation, food delivery, movie tickets, flight reservation, hotel booking, etc. The request to handle an intent may include a performance goal, which may indicate the number of user requests the skill system 125 wants to handle during a given time period. In other embodiments, the performance goal may indicate a monetary goal (e.g., the amount of sales the skill system wants to achieve within a given time period), a number of different users the skill system wants to interact with, a number of new users the skill system wants to interact with, etc. In some embodiments, the performance goal may be associated with a location, for example, a number of user requests the skill system wants to handle with respect to a geographic location/region (which may specified by zip code, city/town, state, country, etc.).

The request to handle an intent may specify an incentive amount/value. In some embodiments, the incentive value may indicate an amount of money, currency, credit or other type of payment that the skill system 125 will provide or has provided for the system(s) 120 to select the service provider over other service providers to handle the particular intent. The incentive value is a value defined by the skill and may correspond, for example, to the skill responding to future user inputs.

The system(s) 120 determines (132) data representing a request-to-handle score corresponding to the skill system(s) 125. The system(s) 120 may determine a request-to-handle score corresponding to the skill system. In some embodiments, the request-to-handle score may be the incentive value (e.g., an amount of money, currency, credit or other type of payment). In this case, the data representing the request-to-handle score may be "$1/request" for a first skill system based on the incentive value provided by the first skill system, and the data representing the request-to-handle score may be "$0.50/request" for a second skill system based on the incentive value provided by the second skill system.

In some embodiments, the request-to-handle score may be based on the performance goal. In this case, the data representing the request-to-handle score may be "10,000 requests in 24 hours" or "$1000 in sales in 24 hours". In other embodiments, the request-to-handle score may be based on a combination of the incentive value and the performance goal. In yet other embodiments, the request-to-handle score may be based on an amount/portion/percentage of the performance goal that has already been achieved/completed. For example, the request-to-handle score may be based on the number of user requests still remaining to achieve the number of user requests indicated in the skill system performance goal. In some embodiments, the request-to-handle score may be based on a satisfaction/feedback rating associated with the skill system, an ability of the skill system to perform an action corresponding to the intent, and other data related to the skill system. The ability of skill system to perform an action may be based on the intent and other information (e.g., user location, time service is requested, item/service requested, price indicated, etc.) corresponding to the user request. For example, a restaurant's ability to respond to a food delivery request may be based on the restaurant's ability to deliver to the user's location at the time requested by the user. As another example, a media streaming skill's ability to respond to a request to watch a movie may be based on whether the movie is available to stream via the media streaming skill. The ability of the skill system to perform an action may be based on various data, such as, the skill's operating hours, the user location, availability of an item/service requested by the user, etc.

In some embodiments, the system(s) 120 may determine a user-specific request-to-handle score corresponding to the skill system, which may be based on one or more of the various data described above, and may be further based on user-specific data and/or interaction-specific data, such as, user profile data associated with the user 10, location data, past user interactions with the system(s) 120, past user interactions with the skill system, user preferences, device type for the device 110 that received the user request, device type for the device 110 that may output/respond to the user request, device capabilities, and other data.

In some embodiments, a skill system associated with a higher incentive value may have a higher request-to-handle score than a skill system associated with a lower incentive value. In some embodiments, a skill system that has a larger amount of its performance goal to complete may have a higher request-to-handle score than a skill system that has a relatively smaller amount of its performance goal to complete.

In some embodiments, the request to handle may indicate a user request(s)/input(s) or type(s) of user request after which the system(s) 120 is to offer/recommend the skill system. For example, a car ride skill may indicate to offer the car ride skill services to a user after the user requested/completed a restaurant reservation or after the user requested traffic information or commute information to work/home, etc.

The system(s) 120 processes (134) input data to determine an intent of a user request. The input data may be the input audio 12 provided by the user 10, and may be processed by an ASR component to determine text data. In other embodiments, the input data may be text data, gestures, selection of interface elements, or other types of input data provided by the user 10 via the device 110. As described in detail below in connection with FIG. 2, the input data may be processed, using a NLU component for example, to determine an intent corresponding to the user request. For example, the input data may represent the user request "I am hungry." The system(s) 120 may process the input data to determine that the corresponding intent is to "order food" or "find a restaurant." In some embodiments, the input data may be processed to determine a domain corresponding to the user request, for example, "food."

The system(s) 120 selects (136) a first skill system capable of responding to the user request based on a request-to-handle score corresponding to at least the first skill system. In selecting the first skill system, the system(s) 120 may determine that the first skill system is capable of responding to the user request by performing an action corresponding to the intent. The system(s) 120 may determine another (third) skill system capable of responding to the user request by performing an action corresponding to the intent. The system(s) 120 may compare a first request-to-handle score associated with the first skill system to a second request-to-handle score associated with the other (third) skill system, and then may select the first skill system based on the comparison. In other embodiments, the system(s) 120 may select the first skill system based on its corresponding request-to-handle score meeting or exceeding a threshold value/condition.

The system(s) 120 selects (138) a second skill system capable of responding to the user request, the selection based on a satisfaction rating of the second skill system. The system(s) 120 may determine a satisfaction rating corresponding to the second skill system based on past interactions between users of the system(s) 120 and the second skill system.

In some embodiments, the system(s) 120 may determine a user-specific satisfaction rating corresponding to the second skill system based on user-specific data and/or interaction-specific data, such as, user profile data associated with the user 10, location data, past user interactions with the system(s) 120, past user interactions with the skill system, user preferences, device type for the device 110 that received the user request, device type for the device 110 that may output/respond to the user request, device capabilities, and other data. In some embodiments, the user 10 may provide feedback to the system(s) 120 or a system associated with a skill system indicating the user's satisfaction in the skill system responding to the user request/performing an action in response to the user request. The feedback may be solicited by the system(s) 120 or the skill system. In some cases, the feedback may be explicit feedback and may be received as a voice input, text input, gestures, or other types of input. In other cases, the feedback may be implicit feedback and may be determined by the system(s) 120 or the skill system by processing data related to the user interaction, such as, image data representing the user's facial expression, audio data (representing an utterance from the user) indicating a sentiment/emotion of the user, text data (representing the user input) indicating a sentiment of the user, other sounds/speech indicating the user's emotions/feelings/sentiment (e.g., "ugh" indicating frustration), and other types of data.

In selecting the second skill system, the system(s) 120 may determine that the second skill system is capable of responding to the user request by performing an action corresponding to the intent of the user request. The system(s) 120 may determine another (third) skill system that is capable of responding to the user request by performing an action corresponding to the intent. The system(s) 120 may determine a first satisfaction rating associated with the second skill system and compare it to a second satisfaction rating associated with the third skill system, and may select the second skill system based on the comparison. In some embodiments, the system(s) 120 may select the second skill system based on its corresponding satisfaction rating meeting or exceeding a threshold value/condition.

The system(s) 120 determines (140) output data including at least a representation of the first skill system and a representation of the second skill system. In some embodiments, the system(s) 120 may determine a category or other description corresponding to the selected first skill system, and similarly determine a category or other description corresponding to the selected second skill system, and include those in the output data. In some embodiments, the system(s) 120 may output audio representing synthesized speech in response to the user request. The output audio may be generated by processing the output data, which may be text data or other forms of data, using text-to-speech (TTS) processing. The output audio may present the two skill systems selected by the system that are capable of responding to the user request. In other embodiments, the output data may be presented to the user in a different manner, including displaying text, sending a message, displaying a visual indicator/icon, etc.

As used herein, selecting a skill system may refer to selecting a skill system, which if approved/confirmed by the user 10, that will receive information to enable the skill system to respond to the user request by performing an action, presenting an output, etc. The information/data may be sent to a system (e.g., a server or other type of computing system) associated with the skill system. In some embodiments, a service provider may be a skill and the data related to the user request may be sent to a skill system (e.g., skill system 225 of FIGS. 2A and 2B).

In response to receiving the two skill systems, the user 10 may provide further user input. In some cases the user may select one of the skill systems to respond to the user request. In other cases, the user may provide further information that the system(s) 120 may use as search criteria to determine another skill system or further refine/filter the previous dialog state/data used to determine a response to the initial/previous user request.

TABLE 2

Sample Dialog

| Turn Number | User Input | System Output | Dialog State |
|---|---|---|---|
| 1 | "Hi." | "Hello, what can I help you with today?" | |
| 2 | "I am hungry." | "Are you in the mood for Mexican or Italian?" | API:food; filter:location data |
| 3 | "No, I had tacos yesterday." | "How about Italian then?" | API:food; filter:location data; filter:NOT Mexican |
| 4 | "Yes that sounds good." | "Italian restaurant ABC has a 5 star rating. Would you like to hear the menu?" | API:food; filter:location data; filter:Italian |
| 5 | "OK." | | |

Referring to the sample dialog in Table 2, at Turn 2, the system processes the user request to determine the user's intent to order food (as described above in relation to step 130). Based on the intent, the system may select an API relating to "food" to determine output data to respond to the user request. The system may further determine some search criteria, filter data, or other information to help in determining a response to the user request. For example, as shown in Table 2, the system may determine to filter/search for an output based on location data. The location data may be determined using the device 110 that received the user request. At turn 2, the system may present two options: Mexican or Italian. These options/categories may be determined as described above in relation to steps 136, 138 and 140. For example, "Mexican" may be a representation of a first service provider—a Mexican restaurant—that is selected based on the request-to-handle score corresponding to the Mexican restaurant. Prior to this interaction, the Mexican restaurant may have sent a request to handle an intent relating to "ordering food" to the system(s) 120. "Italian" may be a representation of a second service provider—an Italian restaurant—that is selected based on the satisfaction rating corresponding to the Italian restaurant. Thus, these two options are presented to the user. At turn 3, the user provides further input, and the system determines additional search criteria/filter data to determine an output. In this case, the system determines to further filter the previous dialog state to not include Mexican food/restaurants. At turn 4, the user selects/confirms "Italian," and the system responds with information on Italian restaurant ABC and includes the satisfaction rating for the restaurant. In this manner, the system of the present disclosure may provide multiple options to the user in response to a user request.

TABLE 3

Sample Dialog

| Turn Number | User Input | System Output | Dialog State |
|---|---|---|---|
| 1 | "Hi." | "Hello, what can I help you with today?" | |
| 2 | "I want to watch a movie." | "How about the new Tom Cruise movie available on VideoSkillA?" | API:movie; filter:actor: "Tom Cruise" |
| 3 | "No, actually play the movie Cast Away." | "That movie is only available on VideoSkillB. Would you like to watch it on VideoSkillB?" | API:movie; filter:movie name: "Cast Away" |
| 4 | "Yes that sounds good." | | |

Referring to the sample dialog of Table 3 above, the system(s) 120 may select a first skill to present to the user based on a first user input in the dialog, and then select a second skill to present to the user based on a second user input, where the second user input may provide additional information that the system(s) 120 can use to present the second skill rather than the first skill. The first skill and the second skill may relate to the same intent. For example, as illustrated in Table 3, in turn 2 of the dialog the user requests to watch a movie, and the system(s) 120 determines a first movie skill (e.g., VideoSkillA) and a first movie (corresponding to slot value: actor: "Tom Cruise" which may be determined based on user preferences of the user 10, user's 10 subscription to VideoSkillA, preferences of other users' of Netflix, etc.). In turn 3 of the dialog, the user provides additional information that causes the system(s) 120 to determine the new slot value:movie name: "Cast Away." Based on the new slot value, the system(s) 120 determines a second movie skill (e.g., VideoSkillB) that can play the requested movie. In this manner, the system(s) 120 can select a first skill in response to a first turn of the dialog, and select a second skill in response to a second turn of the dialog based on the user providing additional information.

Referring to FIG. 1B, the system(s) 120 processes (150) input data to determine an intent of a user request. The input data may be the input audio 12 provided by the user 10, and may be processed by an ASR component to determine text data. In other embodiments, the input data may be text data, gestures, selection of interface elements, or other types of input data provided by the user 10 via the device 110. As described in detail below in connection with FIGS. 2A and 2B, the input data may be processed, using a NLU component for example, to determine an intent corresponding to the user request. For example, the input data may represent the user request "I am hungry." The system(s) 120 may process the input data to determine that the corresponding intent is to "order food" or "find a restaurant." In some embodiments, the input data may be processed to determine a domain corresponding to the user request, for example, "food."

The system(s) 120 selects (152) a first skill system capable of responding to the user request. In some embodiments, the first skill system is selected based on a request-to-handle score corresponding to at least the first skill system, as described above in relation to step 132. In some embodiments, the first skill system may be selected based on a satisfaction rating corresponding to at least the first skill system, as described above in relation to step 134.

The user device 110 (or the system(s) 120 causes the user device 110) presents (154) a representation of the first skill system to the user. In some embodiments, the system(s) 120 may determine a category or other description corresponding to the selected first skill system, and include the category or other description in the output data. In some embodiments, the system(s) 120 may present output audio representing synthesized speech in response to the user request. The output audio may be generated by processing the output data, which may be output text data, using text-to-speech (TTS) processing. The output audio may present the first skill system selected by the system that is capable of responding to the user request. In other embodiments, the output data may be presented to the user in a different manner, including displaying text, sending a message, displaying a visual indicator/icon, etc.

In response, the user 10 may provide an input, in the form of another utterance. The system(s) 120 processes (156) further input data to determine additional search criteria to determine an output responsive to the user request. The system(s) 120 may update the previous dialog state using the additional search criteria.

Using the additional search criteria and the previous dialog state, the system(s) 120 selects (158) a second skill system capable of responding to the user request. In some embodiments, the second skill system is selected based on a request-to-handle score corresponding to at least the second skill system, as described above in relation to step 132. In some embodiments, the second skill system may be selected based on a satisfaction rating corresponding to at least the second skill system, as described above in relation to step 134.

The system(s) 120 may determine output data including a representation of the second skill system, and may present the output data to the user 10 via the user device 110 (in a similar manner as described above in relation to step 154).

In selecting a skill system, the system(s) 120 may consider skill system-specific data in some embodiments. The skill system-specific data may be provided by the skill system, and may include a potential output the skill system may generate in response to a user request. For example, the cost/price of services provided by the skill system, the amount of time to respond to the user request, the amount of time to complete an action corresponding to the user request, discounts/coupons available for the skill system, rewards/loyalty programs associated with the skill system, etc. In some cases, the system(s) 120 may select the skill system based on the user 10 being eligible for the discounts and/or the user 10 being a member of the rewards program (this determination may be made using user profile data corresponding to the user 10).

In some embodiments, the system(s) 120 may determine that the user request specifies a skill system to perform the action corresponding to the user request. This determination may be made using NLU processing and identifying a portion of the user request representing an entity corresponding to the skill system. In an example embodiment, the system(s) 120 may determine another skill system that is capable of responding to the user request, where the other skill system may be able to offer the user better terms/output/output value compared to the skill system specified by the user. For example, if the user request is to book a car ride using a first skill, the device 110/system(s) 120 may determine that the second skill is also capable of booking a car ride within the user's location. The device 110/system(s) 120 may further determine that the second skill has a better price (the cost is less than the first skill) for the car ride requested by the user, and/or that the second skill has a better time to destination (less time than the first skill) for the car ride. The determination that the second skill has better terms/output/results may be made based on data provided by the second skill, which in some embodiments, the system(s) 120 may request the second skill to provide potential output data in response to the user request. In some embodiments, the system(s) 120 may determine to present another skill system based on the request-to-handle score corresponding to the other skill system. In other embodiments, the system(s) 120 may determine to present another skill system based on the satisfaction rating corresponding to the other skill system. The system(s) 120 may determine output data including a representation of the other skill system, and present the output data to the user 10. In another example, the user may request to book a plane ticket using a first airline skill and the request includes the departing and arrival airports. The system(s) 120 may determine, using data from a second airline skill, that a second airline (other than the one the user requested) has a cheaper ticket for the requested departing and arrival airports than the first airline associated with the first airline skill. The system(s) 120 may present a representation of the second airline to the user along with the cheaper price for the ticket.

In some embodiments, the system(s) 120 may select the skill to respond to the user request based on the wakeword used by the user. Different wakewords may activate/initiate different systems or devices. For example, the wakeword "Alexa" (e.g., "Alexa, book a taxi") may activate an Amazon Echo device, while the wakeword "Ford" (e.g., "Ford, play music" may activate a voice-interface installed in a Ford vehicle. Different skills may be activated/enabled for the different systems. Additionally, different systems may be configured to route user request to certain skills over other skills based on the request-to-handle data provided by the skills. For example, one system that is activated by a first wakeword may be configured to select a first taxi skill based on the corresponding request-to-handle data, whereas another system that is activated by another wakeword may be configured to select a second taxi skill based on the corresponding request-to-handle data.

The system may operate using various components as illustrated in FIG. 2. The various components may be located on the same or different physical devices. Communication between various components may occur directly or across a network(s) 199.

An audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without MINI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

In various embodiments, the device 110 may behave differently depending on which wakeword is used. For example, in a multi-user environment, different users may use different wakewords, and the device 110 may tailor its operation in response to a particular user/wakeword matching. The device 110 may, for example, access a user profile associated with a particular wakeword and load device preferences or device usage history stored in the user profile. In other embodiments, a first wakeword may be associated with a first mode of operation of the device 110 and a second wakeword may be associated with a second mode of operation of the device 110. The first mode of operation may be, for example, a personal assistant, and the second mode of operation may be navigation (such as automobile navigation).

In another example the device 110 may be configured to process commands associated with a first wakeword using a different set of components than commands associated with a second wakeword. For example, if an utterance includes the wakeword "Alexa," audio data for that wakeword may be sent to a first speech processing system for speech processing and/or command execution. If an utterance includes the wakeword "Ok Google," audio data for that wakeword may be sent to a second speech processing system for speech processing and/or command execution. In another example the system may also use different wakewords for different skills within a same speech processing system. For example, a user may speak "Ford" as a special wakeword to invoke a specific skill or processing pipeline within a first speech processing system (e.g., a speech processing system that may otherwise be invoked by speaking "Alexa"). Use of the special "Ford" wakeword may result in different routing of the utterance through the first speech processing system than use of a standard wakeword such as "Alexa." Thus the device 110 using the techniques described herein may process incoming audio to determine a first confidence that a detected wakeword is a first wakeword associated with a first speech processing pipeline (which may be a first speech processing system or a first pipeline (e.g., skill, etc.) within the first speech processing system) as well as determine a second confidence that the detected wakeword is a second wakeword associated with a second speech processing pipeline (which may be a second speech processing system or a second, different, pipeline (e.g., skill, etc.) within the second speech processing system. The different systems/pipelines may be associated with different ASR processing, different NLU processing, different commands/intents, or other differences.

Once the wakeword is detected, the device 110 may "wake" and begin transmitting audio data 211, representing the audio 11, to the system(s) 120. The audio data 211 may include data corresponding to the wakeword, or the portion of the audio corresponding to the wakeword may be removed by the device 110 prior to sending the audio data 211 to the system(s) 120.

Upon receipt by the system(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 sends the input audio data 211 to an ASR component 250 that transcribes the input audio data 211 into input text data representing one more hypotheses representing speech contained in the input audio data 211. The text data output by the ASR component 250 may thus represent one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The ASR component 250 may also output respective scores for the one or more ASR hypotheses. Such text data and scores may be output, for example, following language model operations by the ASR component 250. Thus the text data output by the ASR component 250 may include a top scoring ASR hypothesis or may include an N-best list of ASR hypotheses. An N-best list may additionally include a respective score associated with each ASR hypothesis represented therein. Each score may indicate a confidence of ASR processing performed to generate the ASR hypothesis with which the score is associated. Further details of the ASR processing are included below.

The device 110 may send text data 213 to the system(s) 120. Upon receipt by the systems(s) 120, the text data 213 may be sent to the orchestrator component 230, which may send the text data 213 to the NLU component 260. The text data 213 may be derived from an input(s) provided by the user 5 via an application/app on the device 110, where the user 5 may use the application/app to determine stored data to receive a notification when a future event occurs (as described in connection with FIG. 1). The text data 213, for example, may be "notify me when I get an email from" or "tell me when my prescription for is ready for pickup at the pharmacy."

The NLU component 260 receives the ASR hypothesis/hypotheses (i.e., text data) attempts to make a semantic interpretation of the phrase(s) or statement(s) represented therein. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 225, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5.

The NLU component 260 may send NLU results data (which may include tagged text data, indicators of intent, etc.) to the orchestrator component 230. The orchestrator component 230 may send the NLU results data to a skill(s) 290. If the NLU results data includes a single NLU hypothesis, the orchestrator component 230 may send the NLU results data to the skill(s) 290 associated with the NLU hypothesis. If the NLU results data includes an N-best list of NLU hypotheses, the orchestrator component 230 may send the top scoring NLU hypothesis to a skill(s) 290 associated with the top scoring NLU hypothesis.

In some embodiments, the system(s) 120 may include a spoken language understanding (SLU) component that includes one or more components to perform ASR and NLU. The SLU component may process audio data corresponding to an utterance using a trained model(s) and output NLU results data corresponding to the utterance.

A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 225. Such may enable a skill system(s) 225 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system(s) 120 may be configured with a single skill 290 dedicated to interacting with more than one skill system 225.

Unless expressly stated otherwise, reference to a skill, skill device, or skill component may include a skill 290 operated by the system(s) 120 and/or skill operated by the skill system(s) 225. Moreover, the functionality described herein as a skill may be referred to using many different terms, such as an action, bot, app, or the like.

The system(s) 120 may include a TTS component 280 that generates audio data (e.g., synthesized speech) from text data using one or more different methods. Text data input to the TTS component 280 may come from a skill 290, the orchestrator component 230, or another component of the system(s) 120. In some embodiments, the input to the TTS component 280 may be other forms of data instead of or in addition to text data.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include profile storage 270. The profile storage 270 may include a variety of information related to individual users, groups of users, devices, etc. that interact with the system(s) 120. A "profile" refers to a set of data associated with a user, device, etc. The data of a profile may include preferences specific to the user, device, etc.; input and output capabilities of the device; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith.

Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The orchestrator component 230 may send NLU data to the dialog manager 275; in some embodiments, the dialog manager 275 is a skill component 290. The dialog manager 275 determines output text data using the NLU data. The system may include more than one dialog manager 275; each dialog manager 275 may be associated with one or more different domains, intents, and/or entities. For example, if the NLU data includes intent data corresponding to the "play music" intent and entity data corresponding to "artist: Toto," the orchestrator 230 may send the NLU data to a music-related dialog manager 275, which may determine a response that includes Toto music audio data for output by the user device 110.

The dialog manager 275 may be a trained model that processes the NLU data (and, in some embodiments, the input text data) and determines output text data representing a response to the command represented in the input text data. The trained model of the dialog manager 275 may be, in some embodiments, a sequence-to-sequence ("seq2seq") model that includes an encoder and a decoder (in addition to other possible components, such as an attention network). The encoder may process the input text data and/or NLU data word-by-word to determine a vector that represents the entire input text data and/or NLU data. The encoder may include one or more nodes having recurrent connections (as described here); these nodes may be, for example, long short-term memory (LSTM) nodes. The encoder may further process the text data and/or NLU data in both a first direction (e.g., from beginning to end) and in a second direction (e.g., from end to beginning); such an encoder may be referred to as a bi-directional encoder. The decoder may then process the vector determined by the encoder (and/or, in some embodiments, one or more outputs of an attention network) to determine a response to the input text data. The response may be a series of words represented by output text data. The dialog manager 275 may be trained using training data; this training data may be, for example, text data representing a collection of commands and corresponding responses.

A skill 290 may be software such as an application. That is, the skill 290 may enable the device 110 and/or system 120 to execute specific functionality in order to provide data and/or produce some other output requested by the user 10. The device 110 and/or system 120 may be configured with more than one skill 290. For example, a weather skill 290 may enable the device 110 and/or system 120 to provide weather information, a ride-sharing speechlet may enable the device 110 and/or system 120 to book a trip with respect to a taxi and/or ride sharing service, and a food-order speechlet may enable the device 110 and/or system 120 to order a pizza with respect to a restaurant's online ordering system.

In some instances, the skill 290 may provide output text data responsive to received NLU results data. The device 110 and/or system 120 may include a synthetic speech-generation component 280 that generates output audio data from input text data and/or input audio data. The synthetic speech-generation component 280 may use one of a variety of speech-synthesis techniques. In one method of synthesis called unit selection, the synthetic speech-generation component 280 analyzes text data against a database of recorded speech. The synthetic speech-generation component 280 may thus select units of recorded speech matching the text data and concatenates the units together to form output audio data. In another method of synthesis called parametric synthesis, the synthetic speech-generation component 280 varies parameters such as frequency, volume, and noise to create output audio data including an artificial speech waveform. Parametric synthesis uses a computerized voice generator, sometimes called a vocoder. In another method of speech synthesis, a trained model, which may be a sequence-to-sequence model, directly generates output audio data based on the input text data.

The device 110 and/or system 120 may include a user recognition component 295. The user recognition component 295 may determine scores indicating whether the audio data 212 originated from a particular user or speaker. For example, a first score may indicate a likelihood that the audio data 212 is associated with a first synthesized voice and a second score may indicate a likelihood that the speech is associated with a second synthesized voice. The user recognition component 295 may also determine an overall confidence regarding the accuracy of speaker recognition operations. The user recognition component 295 may perform user recognition by comparing the audio data 212 to stored audio characteristics of other synthesized speech. Output of the user recognition component 295 may be used to inform NLU processing as well as processing performed by the skill 290.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 3 is a conceptual diagram illustrating how a user request may be processed according to embodiments of the present disclosure. FIG. 3 illustrates the operation of the system 120 from the prospective of the orchestrator 230. After the orchestrator 230 receives the audio data 211 corresponding to a spoken natural language input, the orchestrator 230 may send the audio data 211 to the ASR component 250. The ASR component 250 can transcribe audio data into one or more ASR hypotheses embodied in ASR output data 305 (e.g., one or more different textual or symbolic representations of the speech contained in the audio data). The ASR output data 305 can include a ranked list of ASR hypotheses or the top-scoring ASR hypothesis when multiple ASR hypotheses are generated for a single natural language input. A top-scoring ASR hypothesis (and/or other ASR hypotheses), which includes the text or symbolic data corresponding to the most likely transcription of the audio data 211 may be sent from the ASR component 250 to the orchestrator 230. The orchestrator 230 may send the ASR output data 305 to the NLU component 260.

The NLU component 260 can receive the ASR output data 305. The NLU component 260 can interpret the ASR output data 305 to determine one or more NLU hypotheses embodied in NLU results data 385 (e.g., one or more different intents and entities contained in the transcription of the audio data 211). The NLU results data 385 can include a ranked list of NLU hypotheses or the top-scoring NLU hypothesis when multiple NLU hypotheses are generated for a single natural language input. A top-scoring NLU hypothesis (and/or other NLU hypotheses), which includes the intent and entity data corresponding to the most likely interpretation of the audio data 211 may be sent from the NLU component 260 to the orchestrator 230.

The orchestrator 230 may send the NLU results data 385 to the dialog manager 275 for processing. The dialog manager 275 may associate a dialog session identifier with the NLU results data 385 to keep track of user inputs and system-generated responses corresponding to a dialog. A dialog turn may refer to a user input and a corresponding system-generated response to the user input. In some embodiments, the dialog manager 275, using the NLU results data 385, may determine an intent corresponding to a user input. The dialog manager 275 may determine one or more skills configured to perform actions corresponding to the intent. The dialog manager 275 may send dialog data 350 to the determined/identified skills capable of performing actions corresponding to the intent. The dialog data 350 may include the intent(s) corresponding to the user input, entities corresponding to the user input, dialog state (representation of user inputs and corresponding system responses/outputs during the dialog session), user related information (e.g., user location, user preferences, user ID), or other data that a skill may use to provide the request-to-handle data. The dialog manager 275 may receive request-to-handle data 360 from one or more skill systems 125. In some embodiments, the dialog manager 275 may request the skills (determined to be configured to perform actions corresponding to the intent) to send request-to-handle data 360. In some embodiments, the dialog manager 275 may retrieve request-to-handle data 360 from a data storage (e.g., data storage 430).

A skill 290/skill system 125 may send the system(s) 120 a request to handle an intent (e.g., a bid to respond to particular user requests) to inform the system(s) 120 that the skill 290 would like to have an opportunity to respond to user requests corresponding to the particular intent. The request-to-handle data 360 may include an intent that the skill 290 desires to handle, for example, book a car ride, restaurant reservation, food delivery, movie tickets, flight reservation, hotel booking, etc. The request-to-handle data 360 may include a performance goal, which may indicate the number of user requests the skill 290 wants to handle during a given time period. In other embodiments, the performance goal may indicate a monetary goal (e.g., the amount of sales the skill 290 wants to achieve within a given time period), a number of different users the skill 290 wants to interact with, a number of new users the skill 290 wants to interact with, etc. In some embodiments, the request-to-handle data 360 may indicate that the performance goal is associated with a location, for example, a number of user requests the skill systems wants to handle with respect to a geographic location/region (which may specified by zip code, city/town, state, country, etc.). The request-to-handle data 360 may also include an incentive value that the skill 290 will provide or has provided for the system(s) 120 to select the skill 290 over other skills to handle the particular intent. The table below shows example data stored in a request-to-handle storage 430, where each data record may be the request-to-handle data 360 provided by the skill system 125.

TABLE 4

Example Request-to-Handle Data

| Skill ID | Intent | Incentive | | Other data | Performance Goal | | | Time | Location |
| --- | --- | --- | --- | --- | --- | --- | --- | --- | --- |
| | | Value | Type | | Number of requests | Sales goal | User type | | |
| A123867 | Book Taxi | 0.50 | Currency | Per request | 10,000 | | | | Boston, MA |
| X567091 | Restaurant Reservation | 1000 | Credit | For 24 hours | | $1000 | | Weekend | |
| B190746 | Food Delivery | 1.00 | Currency | Per request | 100 | | New user | | Seattle |
| T8694814 | Hotel Booking | 0.20 | Currency | Per request; 1 week | 5000 | | | | New York |

As shown, the request-to-handle data 360 provided by the skill system 125 may include the intent of the type of user requests the skill system 125 is requesting to respond to. The request-to-handle data 360 may include incentive value data, which may be an amount of currency/credit provided by the skill system 125 and whether that amount is provided per request that is routed to the skill system 125 and/or provided for a time period (such as, next 24 hours). The request-to-handle data 360 may include performance goals such as number of requests desired to be fulfilled (e.g., 10,000 requests, etc.), amount of sales to be achieved (e.g., $1000 in sales), a type of user corresponding to the user request (e.g., user requests from new users, user requests from returning users, user requests from members (rewards program members, loyalty program members, existing account holders, etc.) of the skill system 125), time duration during which user request is received (e.g., user requests received over the weekend, user requests received during the week, user requests received after 5 pm, etc.), location corresponding to the user and/or corresponding to the user request (e.g., user requests originating in New York, user requests for a taxi in Boston, user requests for food delivery in Seattle, etc.).

The request-to-handle storage 430 may also include a skill identifier to determine which skill system 125 to present to the user in response to a user request. As discussed herein, the system(s) 120 may use the data shown in the above table to determine a request-to-handle score corresponding to the skill system 125. The system(s) 120 may perform various operations, use an algorithm(s), a machine-learning model(s), a statistical operation, one or more rules, or other types of operations on the request-to-handle data 360 to determine the request-to-handle score.

The dialog manager 275 may process the request-to-handle data 360 corresponding to multiple skills 290 to select one or more skills to present to the user. As described above in relation to FIGS. 1A and 1B, the dialog manager 275 may select a skill based on the corresponding request-to-handle data 360 and may select another skill based on its corresponding past interaction data, such as satisfaction rating. The dialog manager 275 may determine output data 310 including a representation of the selected skills 290.

The orchestrator 230 may forward the output data 310 to a natural language generation (NLG) component 326. The NLG component 326 transforms structured data/machine code to a natural language representation of the output data 310. The NLG component 326 may determine output text data 315 representing a natural language representation of the output data 310, and send it to the orchestrator 230. The orchestrator 230 may determine to output synthesized speech, and may send the output text data 315 to the TTS component 280. The TTS component 280, as described above in relation to FIG. 2, may determine output audio data 320 representing synthesized speech corresponding to the output text data 315.

The NLG component 326 may include a trained model, such as a neural network. The NLG component 326 may generate output text data 406 such that it has a natural feel and, in some embodiments, includes words and/or phrases specifically formatted for a requesting individual. As opposed to using templates to formulate responses, the NLG component 326 may include models trained from the various templates for forming the output text data 406. For example, the NLG component 326 may analyze transcripts of local news programs, television shows, sporting events, or any other media program to obtain common components of a relevant language and/or region. As one illustrative example, the NLG component 326 may analyze a transcription of a regional sports program to determine commonly used words or phrases for describing scores or other sporting news for a particular region. In some embodiments, the NLG component 326 may also receive, as inputs, a dialog history corresponding to previous turns in the instant dialog, a level or formality, and/or a command/action history.

The NLG component 326 may generate a system-response for the dialog turn based on one or more response templates. For example, the NLG component 326 may select a template in response to the question, "What is the weather currently like?" of the form: "The weather currently is <weather_information>." The NLG component 326 may analyze the logical form of the template to produce one or more textual responses including markups and annotations to familiarize the response that is generated. In some embodiments, the NLG component 326 may determine which response is the most appropriate response to be selected. The selection may, therefore, be based on past responses, past questions, a level of formality, and/or any other feature, or any other combination thereof.

Figure 4:
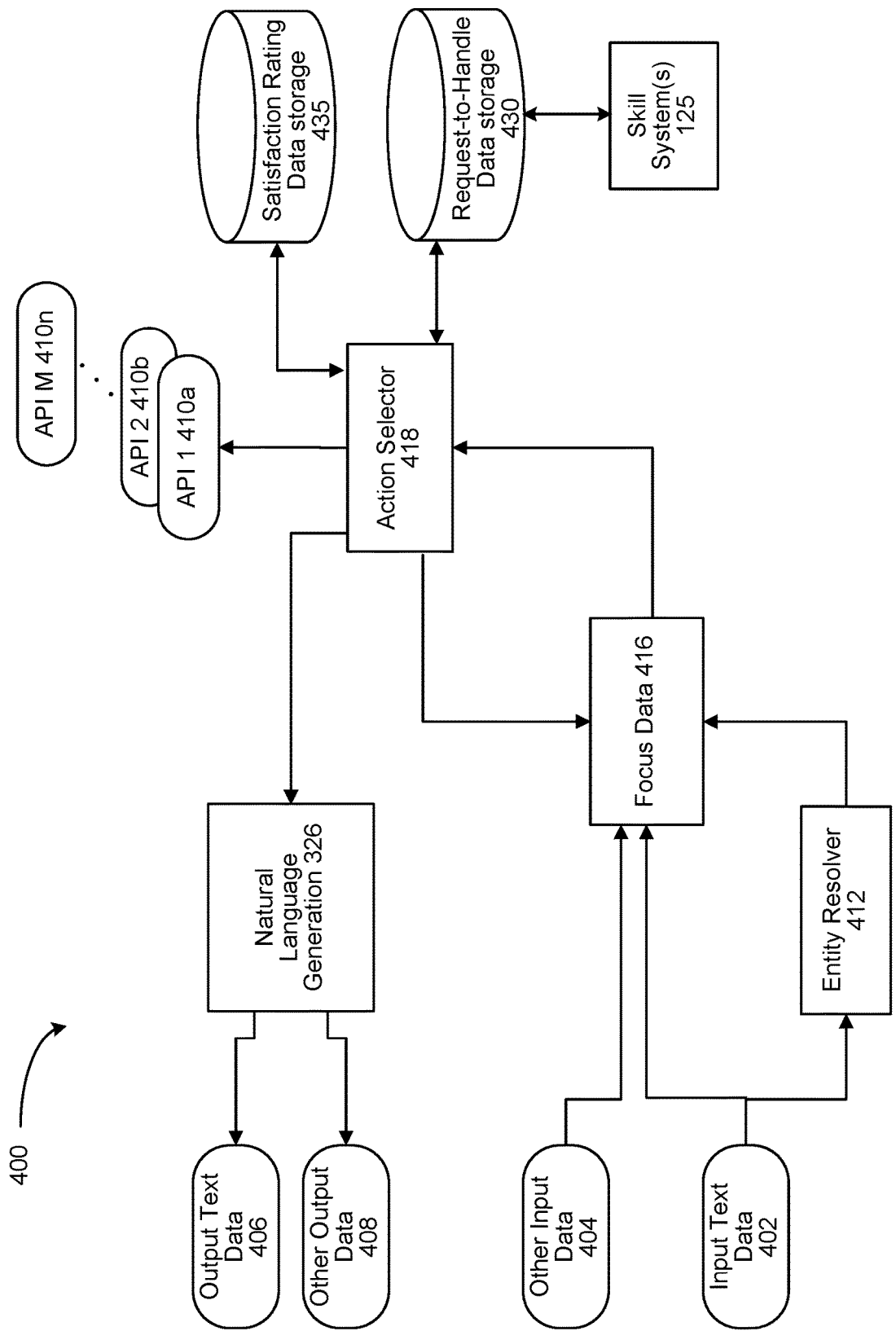
FIG. 4 is a conceptual diagram of a system for responding to a user request using request-to-handle data from skill systems according to embodiments of the present disclosure.

FIG. 4 is a conceptual diagram of a system 400 for responding to a user request using request-to-handle data from skill systems according to embodiments of the present disclosure. One or more components shown in FIG. 4 may be part of the dialog manager 275. For example, the dialog manager 275 may include the entity resolver 412, the focus data component 416 and the action selector 418. The system receives input text data 402; the input text data 402 may include text corresponding to a user input and metadata indicating further information about the text (such as an identity of the user, an emotional state of the user, etc.). The input text data 402 may be text representing words, instructions, markup language, speech, or gestures, or may be a vector or other representation of the same. The input text data 402 may be generated by a user via a keyboard, touchscreen, microphone, camera, or other such input device. In other embodiments, the input text data 402 is created using ASR, as described above, from audio data received from a user. The system may further receive other input data 404, which may correspond to a button press, gesture, or other input. As described in greater detail below, using the input text data 402 and/or other input data 404, the system may determine and output text data 406 and/or other output data 408. The system may instead or in addition perform an action based on the input text data 402 and/or other input data 404, such as calling one or more APIs 410.

An entity resolver 412 may be used to determine that the input text data 402 includes a representation of one or more entities, a process that may include named entity recognition (NER)—i.e., determining that the input text data 402 includes the representation—and entity resolution (ER)—i.e., identifying a meaning or context of the entity, such as associating an identity of a person based on a recognized nickname. An entity may be a person, place, thing, idea, and/or goal; example entities include proper names, nicknames, business names, place names, and/or application names.

In some embodiments, a single entity resolver 412 is used for more than one domain (i.e., a "cross-domain" entity resolver 412). Each domain may correspond to one or more dialog models. One or more candidate domains corresponding to the input text data 412 may be determined; entity resolvers 412 corresponding to the candidate domains may be used to process the input text data 412. The dialog focus data 416 may store the output entities from each candidate domain and may remove unselected entities when an API 410 is selected or an action to be performed is determined.

The dialog focus data 416 may store state data corresponding to dialog history data (including an intent(s), an entity(ies), etc. corresponding to a prior turn in the dialog), action history data, and/or other data. In some embodiments, the other components (e.g., the action selector 418) do not store state data and instead query the dialog focus data 416 for the state data. The system may send some or all of the dialog focus data 416 to other systems and/or may receive additional dialog focus data from other systems. In some embodiments, the other components (e.g., the action selector 418) include a feature-extractor component to extract features from the dialog focus data 416.

The dialog focus data 416 may be graph-based data including a plurality of graph nodes; each graph node may correspond to an item of state data, such as an entity type, entity value, prior API call, and/or user data. The other components, such as the action selector 418, may access all of the graph nodes of the dialog focus data 416 or may access only a subset of the graph nodes of the dialog focus data 416. The dialog focus data 416 may be any type of storage mechanism and may serve as long-term and/or short term memory for the system, thus enabling tracking of entities, ASR output, TTS output, and other features) at each turn through a dialog. In some embodiments, the dialog focus data 416 is updated after each turn of dialog with updated dialog focus data; in other embodiments, the dialog focus data 416 is updated after an end of a dialog is determined.

The entity resolver 412 may utilize gazetteer information stored in an entity library storage. The gazetteer information may be used to match text data (representing a portion of the user input) with text data representing known entities, such as song titles, contact names, etc. Gazetteers may be linked to users (e.g., a particular gazetteer may be associated with a specific user's music collection), may be linked to certain skills 290 (e.g., a shopping skill, a music skill, a video skill, etc.), or may be organized in a variety of other ways.

For example, the entity resolver 412 may parse the input text data 402 to identify words as subject, object, verb, preposition, etc. based on grammar rules and/or models prior to recognizing named entities in the text data. The entity resolver 412 may perform semantic tagging, which is the labeling of a word or combination of words according to their type/semantic meaning. The entity resolver 412 may parse text data using heuristic grammar rules, or a model may be constructed using techniques such as Hidden Markov Models, maximum entropy models, log linear models, conditional random fields (CRF), and the like. For example, an entity resolver 412 implemented by a music skill recognizer may parse and tag text data corresponding to "play mother's little helper by the rolling stones" as {Verb}: "Play," {Object}: "mother's little helper," {Object Preposition}: "by," and {Object Modifier}: "the rolling stones." The entity resolver 412 identifies "Play" as a verb based on a word database associated with the music skill and may determine that the verb corresponds to a <PlayMusic> intent.

The entity resolver 412 may tag text data to attribute meaning thereto. For example, the entity resolver 412 may tag "play mother's little helper by the rolling stones" as: {skill} Music, {intent}<PlayMusic>, {artist name} rolling stones, {media type} SONG, and {song title} mother's little helper. For further example, the entity resolver 412 may tag "play songs by the rolling stones" as: {skill} Music, {intent}<PlayMusic>, {artist name} rolling stones, and {media type} SONG.

The entity resolver 412 may apply rules or other instructions to transform labels or tokens into a standard representation. The transformation may depend on the skill 290. For example, for a travel skill, the entity resolver 412 may transform text data corresponding to "Boston airport" to the standard BOS three-letter code referring to the airport. The entity resolver 412 can refer to an entity storage(s) (including text data representing entities known to the system) to resolve the precise entity referred to in each slot of each NLU hypothesis represented in the cross-skill N-best list data. Specific intent/slot combinations may also be tied to a particular source, which may then be used to resolve the text data. In the example "play songs by the stones," the entity resolver 412 may reference a personal music catalog, Amazon Music account, user profile data, or the like. The entity resolver 412 may output text data including an altered N-best list that is based on the cross-skill N-best list data, and that includes more detailed information (e.g., entity IDs) about the specific entities mentioned in the slots and/or more detailed slot data that can eventually be used by a skill 290. The entity resolver 412 may include multiple entity resolution components and each entity resolution component may be associated with one or more particular skills 290.

The entity resolver 412 may use frameworks linked to the intent to determine what database fields should be searched to determine the meaning of tagged entities, such as searching a user's gazetteer for similarity with the framework slots. For example, a framework for a <PlayMusic> intent might indicate to attempt to resolve an identified object based on {Artist Name}, {Album Name}, and {Song name}, and another framework for the same intent might indicate to attempt to resolve an object modifier based on {Artist Name}, and resolve the object based on {Album Name} and {Song Name} linked to an identified {Artist Name}. If the search of the gazetteer does not resolve a slot/field using gazetteer information, the entity resolver 412 may search a database of generic words associated with the skill 290. For example, if the text data includes "play songs by the rolling stones," after failing to determine an album name or song name called "songs" by "the rolling stones," the entity resolver 412 may search the skill vocabulary for the word "songs." In the alternative, generic words may be checked before the gazetteer information, or both may be tried, potentially producing two different results.

The entity resolver 412 may include a ranker component. The ranker component may assign a particular confidence score to each hypothesis input therein. The confidence score of a hypothesis may represent a confidence of the system in the processing performed with respect to the hypothesis. The confidence score of a particular hypothesis may be affected by whether the hypothesis has unfilled slots. For example, if a hypothesis associated with a first skill component includes slots that are all filled/resolved, that NLU hypothesis may be assigned a higher confidence score than another hypothesis including at least some slots that are unfilled/unresolved by the entity resolver 412.

The focus data 416 may store data relevant to a dialog. In various embodiments, the dialog focus data 416 stores the input text data 402, other input data 404, entity data from the entity resolver 412 and/or action data and dialog data from an action selector 418 (described in greater detail below). The dialog focus data 416 may further include additional information, such as location data, user preference data, and environment data. In various embodiments, the dialog focus data 416 uses an encoder to encode some or all of the received data into one or more feature vectors and a decoder to determine, based on the feature vectors, intent data corresponding to an intent of a user. The dialog focus data 416 may further include state data that represents prior dialog, actions, or other prior user information or data.

The action selector 418 determines an action to be performed in response to the user request, where the action may include calling an API to perform an action and/or presenting an output to the user. The action selector 418 may include a trained model(s), and may process the dialog focus data 416. If the action selector 418 determines to invoke an API call, one or more APIs 410 may be activated and a corresponding action carried out. If the action selector 418 determines to present a prompt or other output data to the user, the NLG component 326 may be used to generate the output text data 406 and/or other output data 408. In either case, the action selection 418 may update the dialog focus data 416 based on the API call or the output presented to the user.

In some embodiments, the action selector 418 may process data from the request-to-handle storage 430 and data from the satisfaction rating data storage 435 to select one or more skill system(s) 120 capable of responding to the user request, and present the selected skill to the user using the output text data 406. In some embodiments, the system(s)

120 or the action selector 418 may determine a request-to-handle score corresponding to the skill system 125 and store it in the data storage 430. In some embodiments, the request-to-handle score may be the incentive value or an indication of the incentive value. In some embodiments, the request-to-handle score may be based on the performance goal. In other embodiments, the request-to-handle score may be based on a combination of the incentive value and the performance goal. In yet other embodiments, the request-to-handle score may be based on an amount/portion/percentage of the performance goal that has already been achieved/completed. For example, the request-to-handle score may be based on the number of user requests still remaining to achieve the number of user requests indicated in the skill's performance goal. In some embodiments, the request-to-handle score may be based on a satisfaction/feedback rating associated with the skill, an ability of the skill to perform an action corresponding to the intent, and other data related to the skill.

In some embodiments, the system(s) 120 or the action selector 418 may determine a user-specific request-to-handle score corresponding to the skill, which may be based on one or more of the various data described above, and may be further based on user-specific data, interaction-specific data and/or dialog focus data 416, such as, user profile data associated with the user 10, location data, past user interactions with the system(s) 120, past user interactions with the skill, user preferences, device type for the device 110 that received the user request, device type for the device 110 that may output/respond to the user request, device capabilities, dialog state of previous turns of the dialog, and other data.

In some embodiments, the system(s) 120 may determine past interaction data, such as a satisfaction rating corresponding to skill system(s) 125 and store it in the data storage 435. The satisfaction rating may be based on past interactions between users of the system(s) 120 and the skill. In some embodiments, the system(s) 120 may determine a user-specific satisfaction rating corresponding to the skill based on user-specific data, interaction-specific data and/or focus data 416, such as, user profile data associated with the user 10, location data, past user interactions with the system(s) 120, past user interactions with the skill system, user preferences, device type for the device 110 that received the user request, device type for the device 110 that may output/respond to the user request, device capabilities, dialog state of previous turns in the dialog, and other data.

In some embodiments, users may provide feedback to the system(s) 120 or the skill system(s) 125 indicating the user's satisfaction in the service skill responding to the user request/performing an action in response to the user request. The feedback may be solicited by the system(s) 120 or the skill system(s) 125. In some cases, the feedback may be explicit feedback and may be received as a voice input, text input, gestures, or other types of input. In other cases, the feedback may be implicit feedback and may be determined by processing data related to the user interaction, such as, image data representing the user's facial expression, audio data (representing an utterance from the user) indicating a sentiment/emotion of the user, text data (representing the user input) indicating a sentiment of the user, other sounds/speech indicating the user's emotions/feelings/sentiment (e.g., "ugh" indicating frustration), and other types of data.

The action selector 418 may select a skill based on various other factors, including but not limited to, a user's age, user cohort (user affinities or other social organizations), location information (e.g., where the user input originated, where the user intends to travel to, etc.), skill location data, intent, intent type, time of day the user input is received, time of year the user input is received, and others.

The action selector 418 may select a skill based on skill availability, for example, a reservations at a restaurant may indicate availability or no availability for a particular day. The system(s) 120/action selector 418 may determine the number of diners at a restaurant or the number of takeout orders a restaurant is handling based on the number of user requests the system(s) 120 routed to the skill. In another example, the system(s) 120/action selector 418 may determine that a number of user requests were routed to a first skill for a first location/geographic area (e.g., a city), and may determine to route the next/future user requests to another skill for that geographic area.

For a restaurant reservation, the action selector 418 may select a skill based on a number of people in the user's party, since some restaurants may not make reservations for small parties less than a particular number. The action selector 418 may select a skill based on person(s) other than the user that may be involved in the user request. For example, if the user says "Alexa, what should we do tomorrow?" the system(s) 120 may determine information relating to the other persons in the user's household to select a skill.

The action selector 418 may select a skill based on the dialog state where the dialog state indicates multiple turns/attempts to recommend a skill/service provider, and the action selector 418 may modify the search criteria (e.g., expand the zip code, expand the time frame, etc.) to select a skill.

In some embodiments, the request-to-handle data 430 may be provided by the skill system(s) 125 prior to the system(s) 120 receiving a user request. In other embodiments, the request-to-handle data 460 may be provided by the skill system(s) 125 after the system(s) 120 receives and processes a user request.

The request-to-handle data 430, which is unrelated to past user interactions, may include various information/conditions to determine which user requests to route to the skill system 125, such as, an intent(s), a user type(s), a geographic location(s), a time period during which the user request is received, an item(s) requested, a service(s) requested, etc. For example, the request-to-handle data 430 from a skill system 125 may indicate users requests such as food delivery requests in Sunnyvale, car ride requests in Boston after 5 pm, movie requests received from a device that is connected to the Internet, haircut inquires for children in the following states, hotel booking requests for Texas, flight booking requests from destination A to destination B, restaurant reservation requests for the weekend, etc.

In some embodiments, the system(s) 120 or the skill system(s) 125 may escalate or deescalate a request to respond to particular intents/user requests. The system(s) 120 may adjust the request-to-handle score accordingly, for example, to escalate increasing the request-to-handle score so that more user requests are routed to the skill system 125 or to deescalate decreasing the request-to-handle score so that fewer user requests are routed to the skill system 125. For example, a restaurant may escalate a request to respond to restaurant reservations to fill empty tables over the weekend or week, or the restaurant may deescalate a request to respond to restaurant reservations when reservations are not available/restaurant is booked.

The system(s) 120 may increase a request-to-handle score or decrease a request-to-handle score based additional information provided by the skill system 125, the number of user requests routed to the skill, the portion of the performance goal achieved, etc. For example, the system(s) 120 may decrease the request-to-handle score if a certain number of user requests (a threshold amount) were routed to the skill system within a time period, the system(s) 120 may increase the request-to-handle score if the number of user requests indicated in a performance goal was not met and the time period to meet the goal was approaching, or the system(s) 120 may adjust the request-to-handle score based on additional incentive value provided by the skill system 125.

FIGS. 5A and 5B are process flow diagrams for managing goal-oriented dialog using requests to handle from skills according to embodiments of the present disclosure. The process flow of FIG. 5A describes the skills providing requests to handle to the action selector 418 prior to receiving a user request. Skill A system 125a may send a request to handle an intent 502 to the action selector 418. The request to handle an intent 502 may specify the intent that skill A wants to handle, a performance goal and/or an incentive value. A skill B system 125b may send a request to handle an intent 504 to the action selector 418. The request to handle an intent 504 may specify the intent that the skill B wants to handle, a performance goal and/or an incentive value. The action selector 418 may determine request-to-handle score(s) 506 corresponding to the skill A and the skill B, and may store the request-to-handle score(s) 506 in request-to-handle data storage 430.

After determining and storing the request-to-handle scores 506, the system(s) 120 may receive a user input. The user input may be processed as described above in relation to FIG. 2 and FIG. 4. The focus data 416 may send user input data, dialog state data, and other data 508 corresponding to the user input to the action selector 418. The dialog state data may indicate an intent of the user input. The action selector 418 may determine one or more skills that are capable of responding to the intent. For example, skill A and skill B may be capable of responding to the intent. The action selector 418 may retrieve the request-to-handle scores 506 corresponding to the skill A and skill B from the data storage 430. The action selector 418 may select (512) a skill based on the request-to-handle scores, as described above in relation to FIGS. 1A and 1B. The action selector 418 may determine output data including a representation of the selected skill 514 and may send the output data 514 to the NLG component 326 for further processing. The system(s) 120 may present the output data including a representation of the selected skill to the user, thus, offering the selected skill to complete an action requested by the user.

The process flow of FIG. 5B describes the action selector 418 soliciting request to handle data from skills in response to receiving a user request. The system(s) 120 may receive a user input. The user input may be processed as described above in relation to FIG. 2 and FIG. 4. The focus data 416 may send user input data, dialog state data, and other data 520 corresponding to the user input to the action selector 418. The dialog state data may indicate an intent of the user input. The action selector 418 may determine one or more skills that are capable of responding to the intent. For example, skill A and skill B may be capable of responding to the intent. The action selector 418 may send a request to handle 522 to the skill B and a request to handle 524 to the skill A.

The skill A system 125a may send a request to handle an intent 526 to the action selector 418 specifying a performance goal and/or an incentive value for handling the intent/user request. The skill B system 125b may send a request to handle an intent 528 to the action selector 418 specifying a performance goal and/or an incentive value for handling the intent/user request. The action selector 418 may determine request-to-handle score(s) 532 corresponding to the skill A and the skill B, and may store the request-to-handle score(s) 532 in request-to-handle data storage 430. The action selector 418 may select (530) a skill based on the request-to-handle scores, as described above in relation to FIGS. 1A and 1B. The action selector 418 may determine output data including a representation of the selected skill 534 and may send the output data 534 to the NLG component 326 for further processing. The system(s) 120 may present the output data including a representation of the selected skill to the user, thus, offering the selected skill to complete an action requested by the user.

The system(s) 120 may select a skill based on skill-provided data, such as the request-to-handle data described herein, skill-based data, skill-related data, data unrelated to past user interactions, data corresponding to responding to future user inputs, data corresponding to the system routing future user inputs to the skill, etc. For example, the operator of a skill may offer certain incentives to user(s) or others in order to receive future user inputs. The system(s) 120 may select a skill based on past user interaction data, such as user(s) preferences, user(s) satisfaction/feedback rating, user-interaction based data, interaction-related data, historical interaction data, etc.

Neural networks may be used to perform dialog processing, including translation-model processing and language-model processing. In the case in which a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, the prediction of the potential next word may be based on previous words in an utterance and not just on the most recent word. The language model neural network may also output weighted predictions for the next word.

Processing by a neural network may be determined by the learned weights on each node input and the structure of the network. Given a particular input, the neural network determines the output one layer at a time until the output layer of the entire network is calculated. Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with an entire lattice to improve speech recognition when the entire lattice is processed.

The model(s) discussed herein may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component may require establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

FIG. 6 is a block diagram conceptually illustrating a device 110 that may be used with the system. FIG. 7 is a block diagram conceptually illustrating example components of a remote device, such as the system(s) 120, which may assist with ASR processing, NLU processing, etc., and the skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (110/120/225) may include one or more controllers/processors (604/704), which may each include a central processing unit (CPU) for processing data and computer-readable instructions, and a memory (606/706) for storing data and instructions of the respective device. The memories (606/706) may individually include volatile random access memory (RAM), non-volatile read only memory (ROM), non-volatile magnetoresistive memory (MRAM), and/or other types of memory. Each device (110/120/225) may also include a data storage component (608/708) for storing data and controller/processor-executable instructions. Each data storage component (608/708) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (602/702).

Computer instructions for operating each device (110/120/225) and its various components may be executed by the respective device's controller(s)/processor(s) (604/704), using the memory (606/706) as temporary "working" storage at runtime. A device's computer instructions may be stored in a non-transitory manner in non-volatile memory (606/706), storage (608/708), or an external device(s). Alternatively, some or all of the executable instructions may be embedded in hardware or firmware on the respective device in addition to or instead of software.

Each device (110/120/225) includes input/output device interfaces (602/702). A variety of components may be connected through the input/output device interfaces (602/702), as will be discussed further below. Additionally, each device (110/120/225) may include an address/data bus (624/724) for conveying data among components of the respective device. Each component within a device (110/120/225) may also be directly connected to other components in addition to (or instead of) being connected to other components across the bus (624/724).

Referring to FIG. 6, the device 110 may include input/output device interfaces 602 that connect to a variety of components such as an audio output component such as a speaker 612, a wired headset or a wireless headset (not illustrated), or other component capable of outputting audio. The device 110 may also include an audio capture component. The audio capture component may be, for example, a microphone 620 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 616 for displaying content. The device 110 may further include a camera 618.

Via antenna(s) 614, the input/output device interfaces 602 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (602/702) may also include communication components that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O interfaces (602/702), processor(s) (604/704), memory (606/706), and/or storage (608/708) of the device(s) 110 system(s) 120, or the skill system(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 225, as described herein, are illustrative, and may be located as a stand-alone device or may be included, in whole or in part, as a component of a larger device or system.

Figure 8:
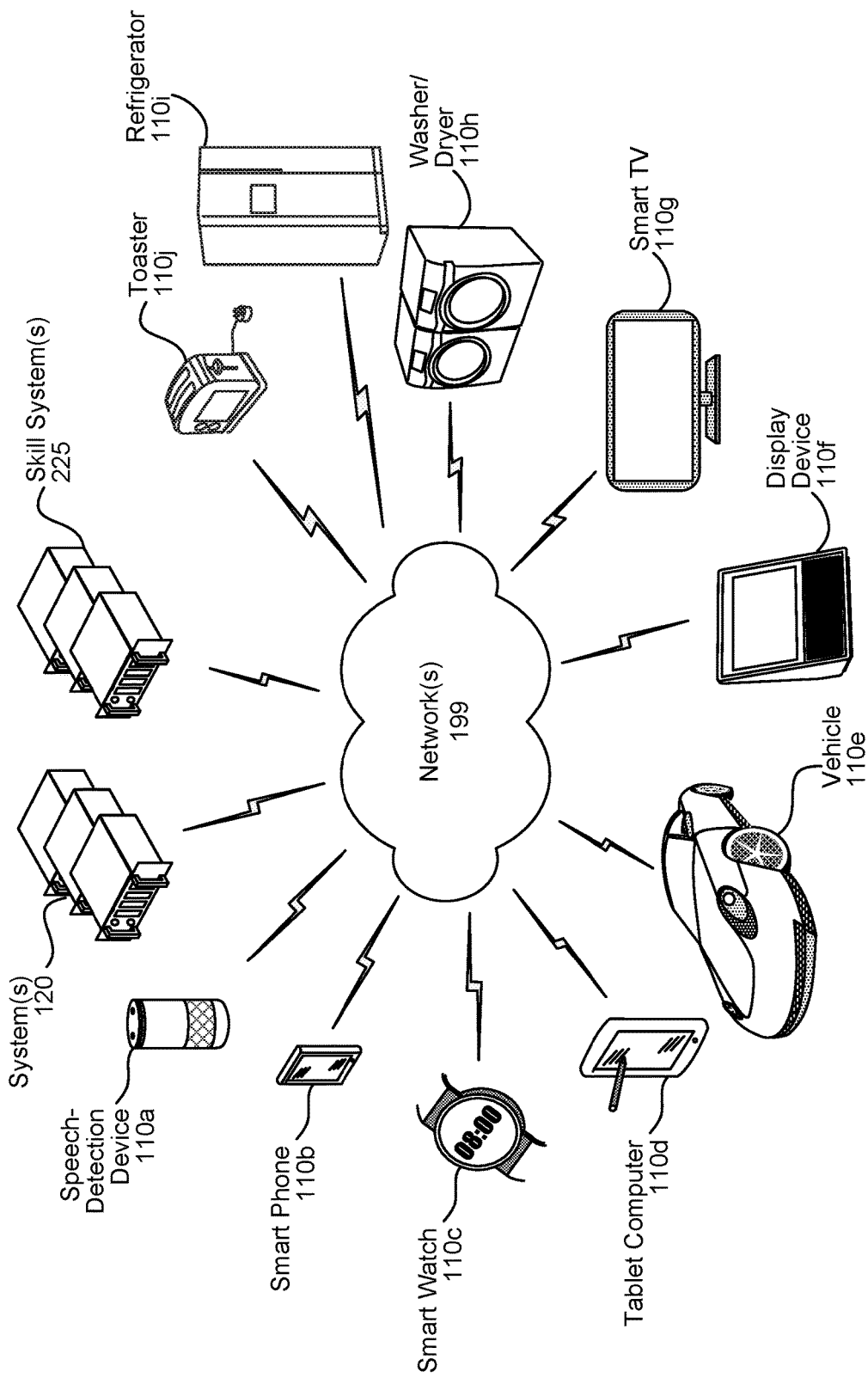
FIG. 8 illustrates an example of a computer network for use with the speech processing system.

As illustrated in FIG. 8, multiple devices (110a-110j, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a toaster 110j may be connected to the network(s) 199 through a wireless service provider, over a WiFi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving, from a device, audio data representing an utterance;
processing the audio data to determine a first intent;
receiving location data corresponding to the device;
receiving, from a first skill, first data including a request to respond to the first intent and a value corresponding to responding to future user inputs, the value being defined by the first skill;
identifying, using the first data, the first skill from a plurality of skills that are capable of performing an action corresponding to the first intent and the location data;
identifying, using second data, a second skill from the plurality of skills, the second data including a first user satisfaction rating corresponding to the second skill, the first user satisfaction rating being based at least in part on past user interactions with the second skill;
identifying, using third data, a third skill from the plurality of skills, the third data including a second user satisfaction rating corresponding to the third skill, the second user satisfaction rating being based at least in part on past user interactions with the third skill;
based at least in part on the first user satisfaction rating and the second user satisfaction rating, selecting the second skill instead of the third skill;
determining output data including at least a first representation of the first skill and a second representation of the second skill, the output data indicating the action is performable using the first skill or the second skill; and
sending the output data to the device to enable a user to select between the first skill and the second skill to perform the action.

2. The computer-implemented method of claim 1, further comprising:
receiving, from a second device, second audio data representing a second utterance;
determining a second intent corresponding to the second utterance;
determining that the second utterance includes an indication of a fourth skill;
determining that a fifth skill is capable of performing an action corresponding to the second intent;
determining a first output value associated with the fourth skill performing an action responsive to the second utterance;
determining a second output value associated with the fifth skill performing an action responsive to the second utterance;
processing the first output value with respect to the second output value;
determining to present the fifth skill based on at least one of a time to destination or price for service;
determining second output data including at least a representation of the fifth skill and an indication of the second output value; and
sending the second output data to the second device.

3. A computer-implemented method comprising:
receiving, from a device, first audio data representing a first utterance;
processing the first audio data to determine an action responsive to the first utterance;
receiving, from a first skill, first data including a first request to respond to the first utterance;
determining the first skill is capable of performing the action;
based on receiving the first data and determining that the first skill is capable of performing the action, determining first output data including a representation of the first skill;
sending the first output data to the device;
after sending the first output data, receiving, from the device, second audio data representing a second utterance;
processing the second audio data to determine an entity value included in the second utterance, the entity value to be used to perform the action;
in response to the second utterance including the entity value, determining a second skill different than the first skill, capable of performing the action using the entity value;
determining second output data including a representation of the second skill; and
sending the second output data to the device.

4. The computer-implemented method of claim 3, further comprising:
receiving, from the device, third audio data representing a third utterance;
processing the third audio data to determine a wakeword represented in the third utterance;
determining a plurality of skills associated with the wakeword;
determining a third skill from the plurality of skills capable of responding to the third utterance;
receiving from the third skill, skill-based data including an incentive value to respond to the third utterance; and
presenting the third skill based at least in part on the incentive value satisfying a condition.

5. The computer-implemented method of claim 3, further comprising prior to receiving the first audio data:
receiving, from the first skill, the first data including a first incentive value; and
determining to present the first skill based at least in part on the first incentive value satisfying a condition.

6. The computer-implemented method of claim 5, further comprising:
receiving location data corresponding to the first utterance;
receiving, from a third skill, a second request to respond to the first utterance, the second request including a second incentive value; and
determining that the third skill is capable of performing the action responsive to the first utterance and the location data,
wherein determining to present the first skill is based at least in part on processing the first incentive value with respect to the second incentive value.

7. The computer-implemented method of claim 3, further comprising:
sending, to the first skill, intent data corresponding to the first utterance;
receiving, from the first skill, skill-provided data including an incentive value; and
presenting the first skill based at least in part on the incentive value satisfying a condition.

8. The computer-implemented method of claim 3, further comprising:
receiving location data corresponding to the device;
determining a first result of the first skill performing the action responsive to the first utterance and the location data;
determining a third skill capable of performing the action;
determining a second result associated with the third skill performing the action responsive to the first utterance and the location data; and
determining to select the first skill based at least in part on the first result and the second result.

9. The computer-implemented method of claim 3, further comprising:
receiving location data corresponding to the device;
determining a first time period during which the first skill is to perform the action responsive to the first utterance and the location data;
determining a third skill capable of performing the action;
determining a second time period during which the third skill is to perform the action responsive to the first utterance and the location data; and
determining to select the first skill based at least in part on the first time period and the second time period.

10. The computer-implemented method of claim 3, wherein the first request includes a first number of times the first skill is to be invoked during a time period and the method further comprises:

determining, using past interaction data, a second number of times the first skill has been invoked during the time period;

receiving, from a third skill, a second request to respond to the first utterance, the second request including a third number of times the third skill is to be invoked during the time period;

determining, using the past interaction data, a fourth number of times the third skill has been invoked during the time period; and determining to select the first skill based at least in part on a comparison of the second number and the fourth number.

11. The computer-implemented method of claim 3, further comprising:

receiving, from a second device, third audio data representing a third utterance;

determining a second action responsive to the third utterance;

determining that the third utterance includes an indication of a third skill;

determining that a fourth skill is capable of performing the second action;

determining a first output value associated with the third skill performing the second action;

determining a second output value associated with the fourth skill performing the second action;

determining, based on a comparison of the first output value and the second output value, to present the fourth skill;

determining third output data including at least a representation of the fourth skill and an indication of the second output value; and sending the third output data to the second device.

12. The computer-implemented method of claim 3, further comprising:

determining user profile corresponding to the second audio data;

determining, using the user profile, past interaction data corresponding to the second skill;

determining, using the past interaction data, a user satisfaction rating corresponding to the second skill; and presenting the second skill based on the user satisfaction rating satisfying a threshold value.

13. A system comprising:

at least one processor; and at least one memory including instructions that, when executed by the at least one processor, cause the system to:

receive, from a device, first audio data representing a first utterance;

process the first audio data to determine an action responsive to the first utterance;

receive, from a first skill, first data including a first request to respond to the first utterance;

determine the first skill is capable of performing the action;

based on receiving the first data and determining that the first skill is capable of performing the action, determine first output data including a representation of the first skill;

send the first output data to the device;

after sending the first output data, receive, from the device, second audio data representing a second utterance;

process the second audio data to determine an entity value included in the second utterance, the entity value to be used to perform the action;

in response to the second utterance including the entity value, determine a second skill, different than the first skill, capable of performing the action using the entity value;

determine second output data including a representation of the second skill; and send the second output data to the device.

14. The system of claim 13, wherein the instructions that, when executed by the at least one processor, further cause the system to:

receive, from the first skill, the first data including a first incentive value; and determine to present the first skill based at least in part on the first incentive value satisfying a condition.

15. The system of claim 14, wherein the instructions that, when executed by the at least one processor, further cause the system to:

receive location data corresponding to the first utterance;

receive, from a third skill, a second request to respond to the first utterance, the second request including a second incentive value; and determine that the third skill is capable of performing the action responsive to the first utterance and the location data, wherein the instructions that cause the system to determine to present the first skill is based at least in part on processing the first incentive value with respect to the second incentive value.

16. The system of claim 13, wherein the instructions that, when executed by the at least one processor, further cause the system to:

send, to the first skill, intent data correspond to the first utterance;

receive, from the first skill, skill-provided data including an incentive value; and present the first skill based at least in part on the incentive value satisfying a condition.

17. The system of claim 13, wherein the instructions that, when executed by the at least one processor, further cause the system to:

receive location data corresponding to the device;

determine a first result of the first skill performing the action responsive to the first utterance and the location data;

determine a third skill capable of performing the action;

determine a second result associated with the third skill performing the action responsive to the first utterance and the location data; and determine to select the first skill based at least in part on the first result and the second result.

18. The system of claim 13, wherein the instructions that, when executed by the at least one processor, further cause the system to:

receive location data corresponding to the device;

determine a first time period during which the first skill is to perform the action responsive to the first utterance and the location data;

determine a third skill capable of performing the action;

determine a second time period during which the third skill is to perform the action responsive to the first utterance and the location data; and determine to select the first skill based at least in part on the first time period and the second time period.

19. The system of claim 13, wherein the first request includes a first number of times the first skill is to be invoked during a time period and the instructions that, when executed by the at least one processor, further cause the system to:
- determine, using past interaction data, a second number of times the first skill has been invoked during the time period;
- receive, from a third skill, a second request to respond to the first utterance, the second request including a third number of times the third skill is to be invoked during the time period;
- determine, using the past interaction data, a fourth number of times the third skill has been invoked during the time period; and
- determine to select the first skill based at least in part on a comparison of the second number and the fourth number.

20. The system of claim 13, wherein the instructions that, when executed by the at least one processor, further cause the system to:
- receive, from a second device, third audio data representing a third utterance;
- determine a second action responsive to the third utterance;
- determine that the third utterance includes an indication of a third skill;
- determine that a fourth skill is capable of performing the second action;
- determine a first output value associated with the third skill performing the second action;
- determine a second output value associated with the fourth skill performing the second action;
- determine, based on a comparison of the first output value and the second output value, to present the fourth skill;
- determine third output data including at least a representation of the fourth skill and an indication of the second output value; and
- send the third output data to the second device.

* * * * *